US012722438B2

(12) United States Patent
Bormann et al.

(10) Patent No.: US 12,722,438 B2
(45) Date of Patent: Sep. 1, 2026

(54) METHOD FOR OPERATING A PNEUMATIC SYSTEM, AND PNEUMATIC SYSTEM INCLUDING COMPRESSED AIR SUPPLY INSTALLATION AND AIR SPRING INSTALLATION

(71) Applicant: ZF CV Systems Europe BV, Brussels (BE)

(72) Inventors: Dirk Bormann, Hildesheim (DE); Marco Seeger, Langenhagen (DE); Uwe Stabenow, Laatzen (DE)

(73) Assignee: ZF CV Systems Europe BV, Brussels (BE)

( * ) Notice: Subject to any disclaimer, the term of this patent is extended or adjusted under 35 U.S.C. 154(b) by 19 days.

(21) Appl. No.: 18/823,482

(22) Filed: Sep. 3, 2024

(65) Prior Publication Data

US 2024/0424851 A1 Dec. 26, 2024

Related U.S. Application Data

(63) Continuation of application No. PCT/EP2023/054165, filed on Feb. 20, 2023.

(30) Foreign Application Priority Data

Mar. 1, 2022 (DE) ..................... 10 2022 104 826.8

(51) Int. Cl.
*B60G 17/015* (2006.01)
*B60G 17/048* (2006.01)
*B60G 17/052* (2006.01)

(52) U.S. Cl.
CPC ....... *B60G 17/0155* (2013.01); *B60G 17/048* (2013.01); *B60G 17/0528* (2013.01)

(58) Field of Classification Search
CPC .............. B60G 17/0155; B60G 17/048; B60G 17/0528; B60G 2400/51; B60G 2500/203; B60G 17/0523; B60G 17/052
See application file for complete search history.

(56) References Cited

U.S. PATENT DOCUMENTS 4,799,707 A 1/1989 Buma et al.
2002/0153688 A1 10/2002 Jurr et al.
(Continued)

FOREIGN PATENT DOCUMENTS

DE 10004880 A1 * 8/2001 ......... B60G 17/0523
DE 101 20 220 A1 10/2002
(Continued)

OTHER PUBLICATIONS

International Search Report of the European Patent Office dated Apr. 12, 2023 for international application PCT/EP2023/054165 on which this application is based.
(Continued)

*Primary Examiner* — Long T Tran
*Assistant Examiner* — Charles J Brauch
(74) *Attorney, Agent, or Firm* — Walter Ottesen, P.A.

(57) ABSTRACT

A pneumatic system has a compressed air supply and an air spring arrangement which is pneumatically connected to the compressed air supply. The pneumatic system is for a vehicle and further has a controller for controlling the compressed air supply and the air spring arrangement. In the method for operating the pneumatic system, the air dryer and/or the air distributor module represents an overpressure volume. The overpressure volume initially has a pressure greater than a pressure in a remaining portion of the compressed air supply having at least one first air spring and an intermediate store. Compressed air is discharged from the overpressure volume into the compensation volume, accom-
(Continued)

panied by a reduction in pressure in the overpressure volume, namely, a reduction in the pressure in the air dryer. Compressed air is discharged into the first air spring of the air spring arrangement and into the intermediate store.

22 Claims, 22 Drawing Sheets

(56) References Cited

U.S. PATENT DOCUMENTS

| | | | |
|---|---|---|---|
| 2006/0006733 | A1 | 1/2006 | Geiger et al. |
| 2008/0290617 | A1 | 11/2008 | Bounds |
| 2013/0255240 | A1 | 10/2013 | Bergemann et al. |
| 2021/0355969 | A1 | 11/2021 | Le Brusq et al. |

FOREIGN PATENT DOCUMENTS

| | | | |
|---|---|---|---|
| DE | 102 40 359 | A1 | 3/2004 |
| DE | 10 2012 006 382 | A1 | 10/2013 |
| DE | 10 2016 123 201 | A1 | 6/2018 |
| DE | 10 2016 124 253 | A1 | 6/2018 |
| EP | 3 863 870 | B1 | 2/2022 |
| JP | 2009-46027 | A | 3/2009 |
| WO | 2008/147850 | A1 | 12/2008 |
| WO | 2023/066912 | A1 | 4/2023 |

OTHER PUBLICATIONS

English translation and Written Opinion of the International Searching Authority dated Apr. 12, 2023 for international application PCT/EP2023/054165 on which this application is based.

Emglish translation and Office Action of the European Patent Office dated Nov. 10, 2025 for corresponding application EP 23 707 026.3.

English translation and Office Action of the European Patent Office dated Dec. 15, 2025 for corresponding application EP 23 707 026.3.

* cited by examiner 300
302
304
306
308
310
312
314
316
TWIN 3.6 mm
TWIN 2.0 mm
TWIN 1.5 mm
Exhaust noise
exhaust air flow
exhaust pressure
1400 l/min
1200 l/min
1000 l/min
800 l/min
600 l/min
400 l/min
200 l/min
0 l/min
4 barg
5 barg
6 barg
7 barg
8 barg
9 barg
10 barg
11 barg
12 barg
13 barg
14 barg
15 barg
16 barg
17 barg
18 barg
19 barg
20 barg 618
610
612
614
616
626
602
604
606
608
622
624
U
P
620
633
638
636
639
641
643
642
640
634
632
628
630
600
M 600
602
604
606
608
610
612
614
616
618
620
622
624
626
628
630
632
633
634
636
638
639
640
641
642
643
U
P
M 618
610
612
614
616
626
602
604
606
608
622
624
U
P
620
633
638
636
639
641
643
634
640
642
632
628
630
M
600

950
900
902
906
907
18 bar
0 bar
10 bar → 0 bar
918
920
922
924
917
926
928
930
932
916
938
984
953 982
913
936
934
915
941
942
954
904
944
980
955
990
986
988
953
910
948

METHOD FOR OPERATING A PNEUMATIC SYSTEM, AND PNEUMATIC SYSTEM INCLUDING COMPRESSED AIR SUPPLY INSTALLATION AND AIR SPRING INSTALLATION

CROSS-REFERENCE TO RELATED APPLICATIONS

This application is a continuation application of international patent application PCT/EP2023/054165, filed Feb. 20, 2023, designating the United States and claiming priority from German application 10 2022 104 826.8, filed Mar. 1, 2022, and the entire content of both applications is incorporated herein by reference.

TECHNICAL FIELD

The disclosure relates to a method for operating a pneumatic system having a compressed air supply installation and an air spring installation, which has air springs and is pneumatically connected to the compressed air supply installation, for a vehicle. The disclosure also relates to a pneumatic system and a vehicle, in particular a passenger car.

BACKGROUND

The components of a compressed air supply installation are connected to one another in such a way that, by controlling the compressed air supply installation with a control device, air can be drawn in from the surroundings by a compressing means, in particular a compressor, the drawn-in air can be dried by an air dryer and the dry compressed air can be conducted into a compressed air reservoir and/or into the air springs via an air distributor module. A pressure sensor is arranged and configured to measure the level of the pressure in the air distributor module and to provide a pressure sensor signal representing the level of the measured pressure to the control device. The control device can adjust the control of the compressed air supply installation on the basis of the measured pressure.

By filling the air springs, it is possible to raise a vehicle relative to the ground. When compressed air is conducted from the air springs into the surrounding atmosphere or into the compressed air reservoir, the vehicle can be lowered relative to the ground.

It is often desirable for a vehicle to be raised and lowered again relatively rapidly. In particular for off-road vehicles and sport utility vehicles (SUVs) with very powerful engines, it is desirable to provide the vehicle with comparatively low ground clearance for high speeds on the road on the one hand, and comparatively high ground clearance for off-road use on the other. It is further desirable to implement a change in ground clearance as rapidly as possible, which increases the requirements, in terms of rapidity, flexibility and reliability, of a compressed air supply installation.

For this purpose, appropriately high pressures in the compressed air supply installation are required. The requirements for an electronically controlled air suspension (ECAS) for a vehicle therefore commonly include high intake and exhaust air flows combined with high pressures in the compressed air supply installation.

However, when the compressed air supply installation is vented, high pressures in the compressed air supply installation may result in a high noise level, also referred to as a discharge bang. These noises are generally undesirable for vehicle users and are therefore reduced by the manufacturer, for example by using silencers. It is thus common practice to install in vehicles additional components which act to minimize a noise level when venting the compressed air supply installation.

In order, inter alia, to reduce the use of further components such as silencers in the vehicle, it has been proposed to reduce a noise level when venting the compressed air supply installation by suitably controlling the compressed air supply installation for venting purposes.

A control means for a compressed air supply installation for venting air from an air spring installation is described, for example, in WO 2008/147850 A1. According to this document, in order to reduce noise when venting a gas suspension system, the air spring valves are initially to be opened and compressed air is thus to be applied to the air springs. It is then necessary to wait until a comparatively lower equilibrium pressure is established in the system. Only when equilibrium pressure has been established in the system is the exhaust valve opened and the gas suspension system vented. Venting is then to be carried out at reduced pressure.

DE 10 2016 123 201 A1 describes that, in order to vent a compressor in at least two method steps, compressed air from the compressor is conducted into at least one air spring of an air spring installation and subsequently vented into the surroundings. For this purpose, it is proposed that venting begins in particular when a maximum pressure is reached. It is reported that this can result in a reduced pressure difference, for example approximately 8 bar rather than approximately 18 bar, when venting into the surroundings. This is said to offer the advantage that it is possible to vent into the surroundings with markedly less noise, due to the reduced discharge thud.

These approaches can be improved further. In particular, it is desirable to ensure a comparatively low venting noise when venting without impairing the functionality of the pneumatic system when venting.

SUMMARY

An object of the disclosure is to provide an improved or at least alternative pneumatic system and method for operating a pneumatic system. The disclosure is based in particular on the object of providing a method for operating a pneumatic system and a pneumatic system which avoid or at least reduce the problems of the prior art.

Preferably, the disclosure is to provide a method for operating a pneumatic system and a pneumatic system in which a comparatively low venting noise is ensured without excessively impairing the functionality of the pneumatic system when venting. Preferably, when venting, excessive overpressure in the air dryer is to be efficiently avoided and preferably reduced within a short period of time. This relates in particular to an overpressure above 12 bar or between 12 bar and 18 bar or more.

The disclosure is based in particular on the object of specifying a method and a pneumatic system which provides or makes it possible to achieve efficient pressure management of high pressures, in particular in the air dryer. A preferred pressure management is to have, to the greatest possible extent, no or only limited or reasonable to little effect on the driving characteristics of a vehicle.

A method for operating a pneumatic system including a compressed air supply installation and an air spring installation, which has air springs and is pneumatically connected to the compressed air supply installation, for a vehicle, in particular for a passenger car, is proposed.

The compressed air supply installation has a pneumatic main line and an air dryer in the pneumatic main line, and the pneumatic main line has a compressing means port to a compressing means and a compressed air supply port to an air distributor module.

The air spring installation of the pneumatic system has a number of air springs, which are pneumatically connected via a gallery of the air spring installation.

The air spring installation of the pneumatic system may optionally have the air distributor module. Alternatively, the air distributor module could also form part of the compressed air supply installation.

The compressing means of the compressed air supply installation may, for example, be formed as a compressor.

The pneumatic system has a control device for controlling the compressed air supply installation and the air spring installation.

In the method, the air dryer and/or the air distributor module represents an overpressure volume.

In the method, the overpressure volume initially has a pressure which, in particular after a step of filling the compressed air supply installation, is greater than a pressure in a remaining portion of the compressed air supply installation, in particular than a pressure in a compensation volume, namely in a compensation volume having at least one air spring and an intermediate storage means and/or only the intermediate storage means.

It is provided according to the disclosure that in the method for reducing the pressure in the overpressure volume, namely in the air dryer and/or the air distributor module, compressed air is discharged from the overpressure volume into the compensation volume, accompanied by a reduction in the pressure in the overpressure volume, namely accompanied by a reduction in the pressure in the air dryer and/or accompanied by a reduction in the pressure in the air distributor module, wherein compressed air is discharged a) into a first air spring of the air spring installation and into the intermediate storage means, or
b) into the intermediate storage means.

If, in a final method step, in particular after the air springs have been filled, the intermediate storage means is filled with compressed air from the overpressure volume, the pressure level for the venting process can be lowered comparatively further, in particular to less than the pressure level of the air springs. This allows the compressed air supply installation to be vented at a comparatively lower discharge noise level.

The intermediate storage means may, however, also be filled with compressed air from the overpressure volume in a first method step, in particular before the air springs are filled. This has the advantage that an effect involving possible level-height changes of a vehicle, caused by filling the air springs with compressed air from the overpressure volume, can be comparatively reduced.

The disclosure is based on the finding that high pressures are necessary within a compressed air supply installation in order to meet the requirements for rapid response times of the compressed air supply installation. It is usually the case however, that the higher the pressure, the higher the noise level when venting the compressed air supply installation. A comparatively large exhaust cross-section, which is necessary to ensure high air dryer efficiency, also promotes a high noise level.

The disclosure is also based on the consideration that silencers often have to be comparatively large in size in order to lower the noise level at the exhaust effectively. However, due to the size thereof, large silencers are often difficult to integrate into a vehicle and also give rise to additional costs. A solution involving the use of two exhausts, with comparatively smaller cross-sections in each case, is also conceivable in order to lower the noise level at the exhaust. However, this solution is comparatively complex and cost-intensive.

The disclosure is based on the further finding that in particular the pressures in the air dryer and/or the air distributor module are critical to the noise level at the exhaust and can often be as high as 18 bar. In contrast, the pressure in the compressed air reservoir is often non-critical and can be reduced during the operation of a vehicle, for example at high speed and at an already correspondingly high noise level in the surroundings.

In particular, the pressures in the air dryer and/or the air distributor module, which are between 12 bar and 18 bar, are critical to the noise level at the exhaust. In particular at pressures of less than 12 bar, it may under certain circumstances be sufficient to vent the compressed air supply installation without previously reducing the pressure in the compressed air supply installation, for example by applying compressed air to the air springs. For example, conventional silencers may be provided for venting pressures of less than 12 bar, these silencers being comparatively small but sufficient to lower the noise level at the exhaust to a sufficient extent at this pressure.

The disclosure is moreover based on the consideration that lowering the pressure in the compressed air supply installation can be achieved by adjusting the control of the compressed air supply installation in such a way that a noise level at the exhaust is markedly reduced when the compressed air supply installation is vented. By controlling the compressed air supply installation in a suitable manner, it is therefore not necessary to employ additional silencers with comparatively large dimensions in the vehicle.

If, however, the compressed air supply installation is controlled in such a way that so much compressed air is applied at once to one or more air springs so as to sufficiently reduce the pressure at the exhaust, and thus sufficiently reduce the noise level when venting, this can have a negative effect on the driving characteristics and be noticeable to a driver. For example, so much compressed air can be applied at once to the vehicle by pressurizing the air springs that a driver notices the vehicle being raised relative to the ground. Filling or venting the air springs with a comparatively large compressed air quantity while a vehicle is being driven may also be noticeable to a driver and cause, for example, uncertainty when driving. A noticeable change in the driving characteristics of a vehicle can thus also represent a safety risk.

The method according to the disclosure therefore provides that compressed air is discharged either into a first air spring of the air spring installation and additionally into the intermediate storage means, or only into the intermediate storage means, in order to reduce the pressure in the overpressure volume.

When compressed air is discharged into the intermediate storage means in addition to the air springs, the pressure in the overpressure volume can be lowered comparatively further still. In particular, it is thus possible to lower the pressure in the overpressure volume to less than the pressure level of the air springs.

Compressed air can be discharged into the intermediate storage means, in particular as the final method step directly before compressed air is vented from the overpressure volume into the surrounding atmosphere. In this case, compressed air is preferably initially applied to the air springs and subsequently applied to the intermediate storage means. This makes it possible to reduce the pressure level at the exhaust further still and to vent the compressed air supply installation at an even lower noise level.

In the method, compressed air may, however, also initially be discharged into the intermediate storage means, that is, the intermediate storage means is filled before the air springs are filled. After the intermediate storage means is filled, the remaining compressed air from the overpressure volume may be distributed to one or more of the air springs. This has the advantage that it is possible for the pressure reduction in the overpressure volume to have little or no effect on the driving characteristics of a vehicle. In particular, this can reduce the extent to which the vehicle is raised due to the application of compressed air to the air springs. This is possible since the pressure in the overpressure volume has already been reduced by filling the intermediate storage means, and only the residual compressed air then needs to be distributed to the air springs.

In a variant of the method, the compensation volume includes the first air spring, and the intermediate storage means includes a second air spring. In this variant, compressed air is preferably discharged in a chronologically consecutive manner individually into the first air spring and subsequently into the second air spring.

The expression "in a chronologically consecutive manner" means that compressed air from the air dryer and/or the air distributor module is applied to the air springs individually in a directly consecutive manner or in a directly consecutive manner in groups of two air springs, that is, without further intermediate steps, such as, for example, further venting or filling. In this process, for example the air spring valve of a first air spring is opened in order to apply compressed air from the air dryer and/or the air distributor module to the latter. The air spring valve of this air spring is subsequently closed again. When the air spring valve of this air spring is closed, the air spring valve of the next air spring is opened in order to apply compressed air to the latter. The procedure is applied consecutively for each of the air springs in order to apply compressed air from the air dryer and/or the air distributor module to these air springs individually in a chronologically consecutive manner. Therefore if, in the method step, compressed air from the air dryer and/or the air distributor module is applied to air springs individually in a chronologically consecutive manner, compressed air is only applied to one of the air springs at any time and the air spring valves of the remaining air springs are closed during this time.

If, however, in the method step, compressed air from the air dryer and/or the air distributor module is applied to air springs in a chronologically consecutive manner in groups of two air springs, two of the corresponding air spring valves of the air springs are opened in each case and the remaining air spring valves of the other air springs are closed. Only when compressed air from the air dryer and/or the air distributor module has been applied to the two air springs, and the air spring valves of these two air springs are closed, is compressed air from the air dryer and/or the air distributor module applied to the two of the remaining air springs. In this method step, compressed air is accordingly only applied to two air springs at any time and the air spring valves of the remaining air springs are closed during this time.

The first air spring may belong to a first group of air springs. The second air spring may belong to a second group of air springs. A plurality of air springs of one of these groups may also be filled jointly, that is, simultaneously, with compressed air. A first group could include, for example, the air springs of the front axle and a second group could include, for example, the air springs of the rear axle of a vehicle. For example, the first air spring could be located on the front axle of the vehicle and the second air spring could be located on the rear axle of the vehicle.

In the method, compressed air from the air dryer and/or the air distributor module could alternatively be applied in a chronologically consecutive manner to groups of at least two air springs, for example, groups of three or four air springs. It is, however, preferred that, for example, the air springs of a front axle of a vehicle form a first group of air springs and the air springs of a rear axle of a vehicle form a second group of air springs. Compressed air from the air dryer and/or the air distributor module is not applied to the first group of air springs at the same time as the second group of air springs, but rather chronologically before or after the latter.

The intermediate storage means may advantageously include the compressing means and/or a connecting volume. The connecting volume has a pneumatic return flow line which connects the gallery to the compressing means via a return flow valve. The pneumatic return flow line of the connecting volume, which connects the gallery to the compressing means via a return flow valve, is in particular a further pneumatic line in addition to the pneumatic main line. For example, compressed air can be conducted into the air springs via the pneumatic main line. To reduce the pressure in the air springs, the return flow valve can be opened and the compressed air can be conveyed from the air springs via the return flow line to the exhaust or into another volume of the compressed air supply installation.

The gallery may also be configured as part of the air distributor module.

As an alternative or in addition to filling the air springs with compressed air from the overpressure volume, compressed air may be discharged from the overpressure volume into the compressing means.

As a further alternative or in addition to filling the air springs and/or the compressing means with compressed air, compressed air from the overpressure volume may be discharged into the connecting volume.

The pressure in the overpressure volume can already be reduced just by discharging compressed air into the compressing means alone or into the connecting volume alone.

If discharging compressed air into the compressing means and/or into the connecting volume is not sufficient to reduce the pressure in the overpressure volume by the desired amount, it may also be provided in the method that compressed air is additionally discharged into at least one of the air springs, that is, compressed air may additionally also be discharged into precisely one air spring only. This air spring may be the one that has a pressure with the smallest pressure difference to the pressure in the air dryer. If discharging compressed air into only one of the air springs is in turn not sufficient to reduce the pressure in the overpressure volume by the desired amount, it may also be provided that compressed air is discharged into the remaining air springs individually in a chronologically consecutive manner or in a chronologically consecutive manner in at least two groups of at least two air springs.

If the compensation volume includes the volumes of more than one component of the pneumatic system, for example the first air spring and the compressing means or the first air spring and the connecting volume or the compressing means and the connecting volume, the pressure in the overpressure volume can be reduced further still.

If the compensation volume includes the volumes of the first air spring, the compressing means and the connecting volume, the pressure in the overpressure volume can in turn be reduced further still.

In this case, a volume of the air springs means in particular a volume of the bellows of the air springs.

In particular, if compressed air from the overpressure volume is applied to the air springs individually in a chronologically consecutive manner or in a chronologically consecutive manner in groups of two air springs, the pressure in the overpressure volume can be reduced in portions over a comparatively longer period of time. The compressed air quantity by which the pressure in the air dryer and/or the air distributor module is to be reduced is also divided among the air springs of the air spring installation connected to the compressed air supply installation, so that the compressed air quantity does not have to be received in full by one air spring alone. The compressed air quantity per air spring is therefore comparatively small. The method thus makes it possible to reduce the pressure in the air dryer and/or the air distributor module in such a way that the reduction in the pressure has no, or at least little, effect on the driving characteristics of a vehicle. This makes it possible to increase safety for a driver. Discharging compressed air into the compressing means and/or the connecting volume also has no effect on the driving characteristics of the vehicle, since this neither raises nor lowers the vehicle. Discharging compressed air into the compressing means and/or the connecting volume in addition to the air springs may be in particular be expedient if the pressure in the overpressure volume is to be reduced by a comparatively large extent in the short term without this having a substantial effect on the driving characteristics of the vehicle.

The pressure in the air dryer and/or the air distributor module can for example be reduced so that the pressure does not exceed a critical upper limit. This makes it possible to protect the air dryer and/or the air distributor module from damage.

The pressure in the air dryer and/or the air distributor module may also be reduced because the compressed air supply installation is to be subsequently vented. The compressed air supply installation is then vented at a comparatively lower pressure at the exhaust, so that the noise level is comparatively lower. This can also increase safety and also comfort for a driver.

The compressed air supply installation operated in accordance with the method may be an open system or a closed system.

An open system is distinguished by the fact that air is drawn in by the compressing means from the surrounding atmosphere and conveyed into air springs of the vehicle, for example in order to raise the vehicle. In an open system, the compressing means draws in air in particular only from the surroundings or discharges air into the surroundings. However, a compressed air reservoir may also be provided in an open system, compressed air being exchangeable between this compressed air reservoir and one or more air springs and/or the compressing means to control the pressure in the compressed air supply installation.

In a closed system, compressed air is conveyed back and forth between a compressed air reservoir and the air springs in order to raise or lower the vehicle. It may be necessary to top up with air from outside even in a closed system. It is therefore common practice for a compressed air supply installation which is a closed system or is operated as a closed system also to have an intake with an intake valve.

In both an open system and a closed system, air flows under pressure through an air dryer when the compressed air supply installation is filled.

In the method, it may also be provided that, after compressed air has been applied to at least two of the air springs individually in a chronologically consecutive manner or in a chronologically consecutive manner in at least two groups of at least two air springs and/or the compressing means and/or the connecting volume, the remaining compressed air from the air dryer and/or the air distributor module is at least partially emitted into the surrounding atmosphere through the exhaust. In particular, the air spring valves are closed before venting. It is moreover preferred that the compressing means is set to idle mode before venting. There is then a comparatively low pressure at the exhaust, so that venting into the surrounding atmosphere takes place at a comparatively lower pressure. In so doing, the noise level generated by venting can be comparatively lower.

In some variants of the method, it is provided that compressed air is discharged from the overpressure volume in a chronologically consecutive manner into the first air spring and the intermediate storage means, beginning with the intermediate storage means. This has the advantage that the pressure in the overpressure volume is already reduced before the air springs are filled. Subsequently filling the air springs with the residual compressed air from the overpressure volume can then have a comparatively smaller effect on the driving characteristics of a vehicle. Any influence on the driving characteristics of the vehicle caused by filling the air springs with compressed air can then be further reduced by applying compressed air to the air springs individually in a chronologically consecutive manner.

It is also possible that the residual compressed air from the overpressure volume is not applied to the intermediate storage means until the process of filling the air springs of the air spring installation with compressed air from the overpressure volume has been completed, that is, the air springs are initially filled with compressed air, and only after the process of filling the air springs is completed is the intermediate storage means filled with the residual compressed air from the overpressure volume. As a result, the pressure level in the overpressure volume can even be lowered to below the pressure level of the air springs. The compressed air supply installation can thus subsequently be vented into the surroundings at a comparatively lower pressure at the exhaust. The noise level generated when venting can thus be reduced comparatively further still.

Optionally, the compressing means may be a two-stage compressing means, and the connecting volume may also include a compressing means line, which pneumatically connects a first compression stage of the compressing means to a second compression stage of the compressing means. The compressing means line and the rest of the connecting volume are then at the pressure generated by the first compression stage. In the rest of the compressed air supply installation and in particular after the second compressing means stage, the compressed air supply installation has a comparatively higher pressure. By filling the connecting volume with compressed air from the overpressure volume, the pressure in the overpressure volume can thus be reduced.

Alternatively or additionally, the connecting volume may include an auxiliary storage means, which is pneumatically connected to the return flow line. An auxiliary storage means represents an additional volume into which compressed air from the overpressure volume can be discharged in order to reduce the pressure in the overpressure volume. An auxiliary storage means thus increases the capacity of the connecting volume.

The compressing means may be a piston compressing means and, in the method, a discharge of compressed air from the overpressure volume into the compressing means may include a discharge of compressed air from the overpressure volume into at least one piston volume of a compressing means piston and/or into a volume of the crankcase and/or into a motor housing of the compressing means.

If compressed air from the overpressure volume is to be discharged into the connecting volume and into at least one of the air springs or into the compressing means and into at least one of the air springs, it is preferred if compressed air is initially discharged into the connecting volume and/or into the compressing means and the remaining compressed air from the overpressure volume is subsequently discharged into at least one of the air springs. If thereafter the pressure in the overpressure volume has not yet been reduced by the desired amount, it is preferred if compressed air is subsequently applied to the remaining air springs individually in a chronologically consecutive manner or in a chronologically consecutive manner in groups of at least two air springs. Preferably, compressed air is applied to the air springs individually in a chronologically consecutive manner or in a chronologically consecutive manner in groups of at least two air springs until the pressure in the overpressure volume has been lowered by the desired amount.

In the method, it is preferred that compressed air from the overpressure volume is applied to the air springs if the pressure sensor initially measures a level of the pressure in the air distributor module of more than 10 bar, in particular more than 11 bar, preferably more than 12 bar, and particularly preferably between 12 bar and 18 bar. In particular, if the pressure in the overpressure volume is 10 bar or more, the pressure at the exhaust is commonly so high that a comparatively high noise level is generated when the compressed air supply installation is vented. It is therefore advantageous that, in particular at pressures of 10 bar or more, according to the method, compressed air from the air dryer and/or the air distributor module is applied to the air springs individually in a chronologically consecutive manner or in a chronologically consecutive manner in groups of two air springs. The pressure at the exhaust can thus be lowered to such an extent that the noise level when venting is comparatively low. According to the method, at a pressure of 10 bar or more, applying compressed air from the air dryer and/or the air distributor module to the air springs in a chronologically consecutive manner individually or in groups of two air springs can prevent the pressure in the air dryer and/or the air distributor module from exceeding a critical value, without the reduction in pressure having a noticeable effect on the driving characteristics of the vehicle.

In the method it may also be provided that compressed air from the air dryer and/or the air distributor module is applied to first and the second air spring individually in a chronologically consecutive manner or in a chronologically consecutive manner in at least two groups of at least two air springs, in a specified compressed air quantity in each case and/or for a predefined period of time in each case and/or to achieve a predefined pressure drop in the air distributor module.

The specified compressed air quantity may be calculated, for example, from the measured pressures of the pressure sensor, the known air dryer and air distributor module volume and the air spring volumes.

Discharging compressed air from the overpressure volume in accordance with a predefined pressure drop in the air distributor module may, for example, be implemented in such a way that a specific pressure drop in the air distributor module is discharged in each case into an air spring. For example, the pressure in the air distributor module may be measured by the pressure sensor, and one of the air springs may be filled with compressed air in each case for the period of time required to achieve a predefined pressure drop. For example, each of the air springs may be filled with compressed air from the overpressure volume to achieve a pressure drop of 1 bar in the air distributor module.

A predefined period of time during which an air spring is filled with compressed air may, for example, be between 50 ms and 400 ms, for example 100 ms.

It is possible that the specified compressed air quantity is selected in such a way that the vehicle is raised excessively when compressed air is applied to the air springs. The compressed air quantity may be selected in such a way that the vehicle is only raised by a comparatively small amount when compressed air is applied in a chronologically successive manner to the air springs, so that the raising of the vehicle has no, or at least little, noticeable influence on the driving characteristics. Filling the air springs with a specified compressed air quantity can also prevent the vehicle from being brought abruptly into an inclined position relative to the ground. Instead, the vehicle is raised little by little or air spring by air spring. The specified compressed air quantity can be applied to the air springs as frequently as required until the pressure in the air dryer and/or the air distributor module has been lowered by a specific, in particular specified, amount or pressure drop. The order in which compressed air, in the specified compressed air quantity, is applied to air springs may vary. The air springs can be filled with the specified compressed air quantity in succession, for example around a vehicle. Compressed air can also be applied to the air springs individually in an alternating manner. For example, the two air springs of the front axle can be filled with the specified compressed air quantity in an alternating manner in order to raise the vehicle little by little at the front axle thereof. In the same manner, the two air springs of the rear axle can be filled with the specified compressed air quantity in an alternating manner in order to raise the vehicle little by little at the rear axle thereof.

Rather than or in addition to the specified compressed air quantity, a predefined period of time for which compressed air is applied to the air springs individually or in groups of two air springs may also be used. The specified period of time for which an air spring valve of an air spring is opened and the air spring is filled accordingly may likewise be used to determine the compressed air quantity with which an air spring is to be filled. Controlling the compressed air quantity based on the predefined period of time thus represents a particularly simple way of limiting the compressed air quantity for a specific air spring.

Optionally, compressed air from the overpressure volume can be applied to the first and the second air spring individually in a chronologically consecutive manner or in a chronologically consecutive manner in at least two groups of at least two air springs on the basis, in each case, of a measured pressure drop in the air distributor module, a known air dryer volume, air distributor module volume and an air spring volume of the air springs and/or an adaptively determined time interval. Applying compressed air from the overpressure volume to the air springs in accordance with an adaptively determined time interval includes controlling the compressed air supply installation on the basis of, for example, a measured pressure drop in the air distributor module, a known air dryer volume, an air distributor module volume and/or an air spring volume of the air springs.

In the method, it may be provided that the compressed air quantity and/or period of time for one or more air springs is specified or predefined depending on the vehicle speed. For example, it may be advantageous for a comparatively small compressed air quantity and/or a comparatively short period of time to be specified or predefined if the vehicle is traveling at a comparatively high speed, for example at more than 80 km/h or more than 100 km/h or more than 130 km/h. If, in contrast, the vehicle is traveling at a comparatively lower speed, for example less than 80 km/h or less than 50 km/h, a comparatively larger compressed air quantity and/or a comparatively longer period of time can be specified or predefined.

It is also conceivable that the compressed air quantity and/or the period of time and/or the predefined pressure drop in the air distributor module is specified or predefined for one or more air springs depending on the diameter of a throttle of the air dryer. The larger the throttle, the greater the compressed air quantity and/or period of time that could be selected.

In the method, it may be provided that the compressed air quantity and/or the period of time are different for at least two of the air springs. For example, the compressed air quantity and/or the period of time for the air springs may be selected in such a way that applying compressed air to the air springs has, to the greatest possible extent, no or only little noticeable effect on the driving characteristics of a vehicle. The compressed air quantity and/or the period of time for the air springs can be selected for example in such a way that the orientation of the underbody of the vehicle relative to the ground is not altered. In particular, compressed air can be applied in a different compressed air quantity and/or for a different period of time to at least two of the air springs in such a way that the of the underbody of the vehicle relative to the ground remains or is parallel to the ground even while and/or after compressed air is applied to the air springs.

In the method, it may additionally or alternatively be provided that the compressed air quantity and/or the period of time for at least one of the air springs is determined on the basis of a relative pressure difference between the pressure in the at least one air spring and the pressure in the air dryer and/or the pressure in the air distributor module. In principle, however, it is preferred that a small compressed air quantity is discharged into one of the air springs in each case during an air spring filling process, so that filling the air spring does not have a negative effect on the driving characteristics of the vehicle. For example, a pressure difference between one or more of the air springs and air dryer and/or the air distributor module may be ascertained. On the basis of the pressure difference ascertained, it is then possible to adjust the control for applying compressed air from the air dryer and/or the air distributor module to the air springs. It may be advantageous if compressed air is applied in a greater compressed air quantity and/or for a longer period of time to the air spring with the highest pressure difference to the air dryer and/or the air distributor module, so that the pressure in this air spring is equalized with the pressures in the remaining air springs. For example, the compressed air quantity and/or the period of time may be selected for each of the air springs in such a way that the relative pressure difference between the pressure in the respective air springs and the pressure in the air dryer and/or the pressure in the air distributor module is substantially identical for each of the air springs. It may, however, also be advantageous if the pressure difference between the air springs of the front axle of a vehicle and the air dryer and/or the air distributor module is greater than the pressure difference between the air springs of the rear axle of a vehicle and the air dryer and/or the air distributor module, or, conversely, the pressure difference between the air springs of the rear axle of a vehicle and the air dryer and/or the air distributor module is greater than the pressure difference between the air springs of the front axle of a vehicle and the air dryer and/or the air distributor module. The compressed air quantity with which and/or the period of time for which compressed air is applied to at least one of the air springs, on the basis of a relative pressure difference between the pressure in the at least one air spring and the pressure in the air dryer and/or the pressure in the air distributor module, may for example be determined by a control device in accordance with these specifications.

In the method, it may optionally be provided that compressed air from the air dryer and/or the air distributor module is applied, as well as to the air springs, to a volume of the compressing means, for example a piston volume, in a specified compressed air quantity and/or for a predefined period of time and/or to achieve a predefined pressure drop in the overpressure volume. If compressed air from the air dryer and/or the air distributor module is applied, as well as to the air springs, to a volume of the compressing means in a specified compressed air quantity and/or for a predefined period of time, the pressure in the air dryer and/or the air distributor module can be additionally reduced. When the compressed air supply installation is subsequently vented, the noise level generated when venting can thus also be further reduced. If compressed air from the air dryer and/or the air distributor module is applied, as well as to the air springs, to a volume of the compressing means in a specified compressed air quantity and/or for a predefined period of time, this results in the further advantage that the excess compressed air does not have to be discharged in full into the air springs alone, and therefore the amount by which the vehicle has to be raised in order to reduce the pressure in the air dryer and/or the air distributor module by a specific amount is comparatively smaller.

Additionally or alternatively, it may also be provided in the method that the compressed air supply installation includes an auxiliary storage means and compressed air from the air dryer and/or the air distributor module is applied, as well as to the air springs, to the auxiliary storage means in a specified compressed air quantity and/or for a predefined period of time.

The auxiliary storage means is in particular part of the connecting volume and is preferably pneumatically connected to the return flow line. The auxiliary storage means may in particular be an independent component of the compressed air supply installation, the auxiliary storage means being connected as an additional component via pneumatic ports to the remaining components of the compressed air supply installation. In principle, an auxiliary storage means provides greater flexibility in the apportioning of excess compressed air to the components of the compressed air supply installation. The use of an auxiliary storage means makes it possible in particular to discharge a portion of this excess compressed air into the auxiliary storage means rather than distributing all of the excess compressed air to the air springs. The compressed air quantity received by the air springs can then be comparatively smaller. Reducing the compressed air in the air dryer and/or the air distributor module can thus have a comparatively smaller influence on the driving characteristics of a vehicle, for example because the vehicle is raised by a comparatively smaller amount.

Preferably, in the method, compressed air from the air dryer and/or the air distributor module is initially conducted into the air spring with a pressure which, in comparison with the pressures in the remaining air springs, has the smallest pressure difference to the pressure in the air distributor module. The air spring with the smallest pressure difference to the pressure in the air distributor module is in particular the first air spring.

For example, the pressure in the air springs can be detected by further, accordingly arranged, pressure sensors and the detected pressures can be made available to a control device.

When compressed air from the air dryer and/or the air distributor module is initially conducted into the air spring with a pressure which, in comparison with the pressures in the remaining air springs, has the smallest pressure difference to the pressure in the air distributor module, it is in particular possible to apply compressed air to the air springs in comparatively small compressed air quantities only. This has the advantage that the vehicle is raised by a comparatively small amount. Raising the vehicle therefore has no, or at least only little, effect on the driving characteristics of a vehicle. The fact that compressed air is initially applied to the vehicle with a pressure which, in comparison with the pressures in the remaining air springs, has the smallest pressure difference to the pressure in the air distributor module has the further advantage that the vehicle is not brought, or at least brought to a minor extent, into an inclined position relative to the ground.

When compressed air from the air dryer and/or the air distributor module is initially conducted into the air spring with a pressure which, in comparison with the pressures in the remaining air springs, has the smallest pressure difference to the pressure in the air distributor module, compressed air can be applied in a subsequent step to the next one of the remaining air springs which, in comparison with the two remaining air springs, has the smallest pressure difference to the pressure in the air distributor module. If thereafter there is still excess compressed air from the air dryer and/or the air distributor module to be distributed to the air springs, this method can be continued air spring by air spring until the pressure in the air dryer and/or the air distributor module has been lowered by the desired amount or pressure drop.

When compressed air from the air dryer and/or the air distributor module is initially conducted into the air spring with the highest pressure in comparison with the pressures in the remaining air springs, the pressure in this air spring can be equalized with the pressures in the remaining air springs. A potential imbalance between the pressures in the air springs can thus be reduced rather than being increased further still. It may also be provided that the air springs consecutively, beginning with the air spring with the highest pressure in comparison with the pressures in the remaining air springs, is continued until a specific compressed air quantity is discharged from the air dryer and/or the air distributor module into the air springs. By beginning with the air spring with the highest pressure in comparison with the pressures in the remaining air springs it is possible, after a specific compressed air quantity has been discharged into the air springs, to achieve a reduction in the maximum pressure difference between one of the air springs and the air dryer and/or the air distributor module.

In particular, when in the method compressed air from the air dryer and/or the air distributor module is initially conducted into the air spring with a pressure which, in comparison with the pressures in the remaining air springs, has the smallest pressure difference to the pressure in the air distributor module, the compressed air from the air dryer and/or the air distributor module can be discharged in each case into the air springs individually in a chronologically consecutive manner, beginning with the air spring with a pressure which, in comparison with the pressures in the remaining air springs, has the smallest pressure difference to the pressure in the air distributor module or the air spring with the highest pressure in comparison with the pressures in the remaining air springs.

For example, compressed air from the air dryer and/or the air distributor module can initially be discharged into the air spring with a pressure which, in comparison with the pressures in the remaining air springs, has the smallest pressure difference to the pressure in the air distributor module, and is subsequently discharged into the air spring, of the remaining air springs, with a pressure which, in comparison with the pressures in the two remaining air springs, has the smallest pressure difference to the pressure in the air distributor module or the air spring with the second-highest pressure in comparison with the pressures in the remaining air springs, and compressed air from the air dryer and/or the air distributor module be subsequently discharged into the air spring, of the two remaining air springs, with a pressure which, in comparison with the pressure in the other remaining air spring, has the smallest pressure difference to the pressure in the air distributor module, and compressed air from the air dryer and/or the air distributor module is finally discharged into the remaining air spring to which compressed air has not yet been applied.

In the method, the smallest pressure difference is thus used to determine an order in which compressed air is applied to the air springs individually in a chronologically consecutive manner. Determining the order based on the smallest pressure difference has the advantage that a vehicle is raised with comparatively low acceleration. As a result, the raising of a vehicle may have no, or at least only little, influence on the driving characteristics of the vehicle. This also prevents the vehicle from being brought into a comparatively sharply inclined position relative to the ground, which can also have a negative effect on the driving characteristics of the vehicle.

In the method it may be advantageous if, in accordance with the order of the air springs ascertained based on the smallest pressure difference to the pressure in the air distributor module, compressed air from the air dryer and/or the air distributor module is applied to the air springs again in the same order in a chronologically consecutive manner, in a or the specified compressed air quantity and/or for a or the predefined period of time in each case. In particular, compressed air can be applied to the air springs individually in a chronologically consecutive manner in the determined order until the pressure in the air dryer and/or the air distributor module has been lowered by a specific amount. The amount by which the pressure in the air dryer and/or the air distributor module is to be lowered may for example be determined in such a way that, after the air springs have been pressurized, the pressure in the air dryer and/or the air distributor module is below a predefined threshold. For example, a threshold may be determined in such a way that the latter indicates the pressure above which damage is to be expected to the air dryer and/or the air distributor module and/or further components or pneumatic lines of the compressed air supply installation. The threshold may also be determined in such a way that the latter indicates the pressure at which the compressed air supply installation can be vented without generating a noise level which exceeds a specified sound level.

In the method it may also be provided that a compressed air quantity is individually specified for the first air spring and/or the intermediate storage means, for example for each of the air springs, and the compressed air supply installation is activated by the control device in such a way that compressed air is discharged into the corresponding one of the air springs in the compressed air quantity specified in each case. A compressed air quantity may accordingly be determined individually for each of the air springs. The compressed air quantity for the respective air springs may be determined on the basis of the pressure in the respective air spring. The pressure for example in each of the air springs can be detected and a compressed air quantity can be specified individually for each of the air springs on the basis of the pressures detected. After a specific period of time has elapsed or after a specific action, for example the opening or closing of an air spring valve, the compressed air quantity can be determined again for one or more of the air springs individually. The compressed air quantity can thus be suitably determined for each of the air springs individually depending on the situation, and the method can thus be carried out in a particularly efficient manner.

In addition or as an alternative to individually specifying a compressed air quantity, it may be provided in the method that a period of time is individually specified for the first air spring and/or the intermediate storage means, for example for each of the air springs, and the compressed air supply installation is activated by the control device in such a way that compressed air is discharged into the corresponding one of the air springs for the period of time specified in each case. The specified individual period of time may in particular be selected in such a way that the air springs are each filled with a specific compressed air quantity. For example, the period of time individually specified in each case can be determined in such a way that the air springs all have a similar pressure after being filled with compressed air. The period of time may also be individually specified for the air springs in such a way that the two air springs of the front axle of a vehicle have a different, for example higher or lower, pressure to the two air springs of the rear axle of the vehicle.

When, in the method, compressed air from the air dryer and/or the air distributor module is applied to the air springs in a chronologically consecutive manner in at least two groups of at least two air springs, it is in particular preferred that the group of two of the air springs includes the two air springs of a front axle or the two air springs of a rear axle of the vehicle.

In the method, it is also preferred that the pneumatic system is activated by the control device in such a way that the compressing means stores a portion of the compressed air while compressed air is being vented through the exhaust, so that the compressed air quantity actually emitted into the surroundings is comparatively smaller.

For example, the compressing means can store a portion of the compressed air in a volume of the compressing means while compressed air is being vented. If the compressing means is, for example, a piston compressing means, the latter could store a portion of the compressed air in a volume of one or more pistons, so that the compressed air quantity actually emitted into the surroundings is comparatively smaller. In particular, compressed air is then emitted into the surroundings with a comparatively smaller pressure difference between a pressure at the exhaust and a pressure in the surroundings. Since the compressed air quantity actually emitted into the surroundings is comparatively smaller, the noise level generated when venting can also be further reduced.

In a second aspect, the above object is, for example, achieved by a pneumatic system for a vehicle.

The pneumatic system for a vehicle, in particular for a passenger car, includes a compressed air supply installation and an air spring installation, which has the air springs and is pneumatically connected to the compressed air supply installation, wherein the pneumatic system has a control device for controlling the compressed air supply installation and the air spring installation. The pneumatic system is configured according to the disclosure to carry out the method described above.

Preferably, the pneumatic system has the following components: a compressing means, an air distributor module, an air dryer, an intake with an intake valve and an exhaust with an exhaust valve for filling with air from the surrounding atmosphere and/or for venting into the surrounding atmosphere, and a pressure sensor for detecting a level of a pressure in the air distributor module. The control device is configured to control, at least depending on the pressure signal, the compressed air supply installation and the air spring installation to carry out the method.

The disclosure is also directed to a vehicle. The vehicle is in particular a passenger car. According to the disclosure, the vehicle has a pneumatic system according to the disclosure.

BRIEF DESCRIPTION OF DRAWINGS

The invention will now be described with reference to the drawings wherein.

DETAILED DESCRIPTION

Figure 1A:
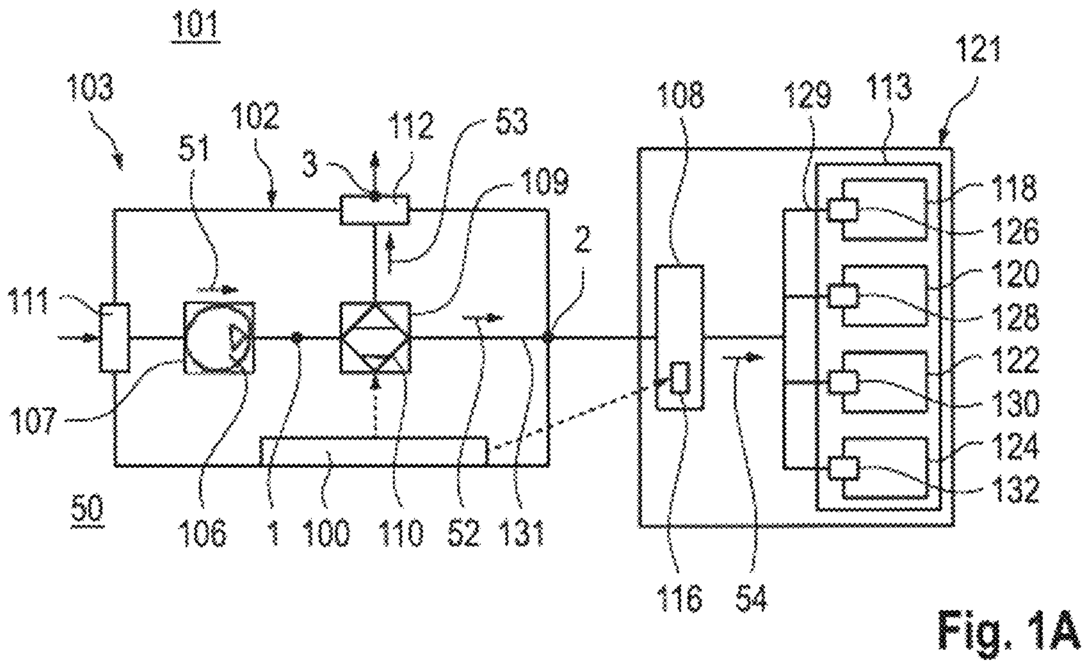
FIG. 1A schematically shows a compressed air supply installation, which is pneumatically connected to an air spring installation and in which the intake and exhaust are realized separately from each other.

FIG. 1A schematically shows a compressed air supply installation 102, which is pneumatically connected to an air spring installation 121, in which a compressing means port 1 and an exhaust 3 are realized separately from each other.

The compressed air supply means 102 and the air spring installation 121 are components of a vehicle 101 and may be used for example to raise or lower the vehicle 101 relative to the ground. The compressed air supply installation 102 and the air spring installation 121 together form a pneumatic system 103.

The compressed air supply installation 102 includes the compressing means port 1 and a compressed air supply port 2. A pneumatic main line 131 with an air dryer 110 extends between the compressing means port 1 and the compressed air supply port 2. The compressed air supply installation 102 also includes a compressing means 106 which is pneumatically connected to the compressing means port 1 and acts to draw in and compress air 51 from the surrounding atmosphere 50 and to transfer the air which has been compressed via the compressing means port 1 to the air dryer 110 as compressed air 52. In this embodiment, the compressing means 106 is formed as a compressor. The air dryer 110 is configured to dry air 51 drawn in from the surrounding atmosphere 50 and to transfer it to an air distributor module 108 via the compressed air supply port 2. The air dryer 110 is also pneumatically connected to an exhaust 3, through which the compressed air supply installation 102 can be vented.

The air distributor module 108 forms part of the air spring installation 121. The air distributor module 108 includes a pressure sensor 116 for detecting a level of the pressure in the air distributor module 108. The air distributor module 108 acts to transfer compressed air 54 to the gallery 129.

The compressed air supply installation 102 further includes a control device 100 for controlling the compressed air supply installation 102. The control device 100 is connected to the pressure sensor 116 of the air distributor module 108 via a data connection 55. A pressure sensor signal, which represents the level of a detected pressure, can be transmitted by the pressure sensor 116 to the control device 100 via the data connection 55. The control device 100 is also connected to the compressing means 106 via a control line 56 in order to control the compressing means 106. For example, the control device 100 can control the compressing means 106 on the basis of a pressure level which is detected by the pressure sensor 116 and has been transmitted by the pressure sensor 116 to the control device 100 via the data connection 55 via a pressure sensor signal.

The air spring installation 121 includes four air springs 118, 120, 122, 124, which can be filled with compressed air 54 via the gallery 129 in order to raise the vehicle 101 relative to the ground. When compressed air 54 is discharged from the air springs 118, 120, 122, 124 into the compressed air supply installation 102, the vehicle 101 is lowered relative to the ground. The four air springs 118, 120, 122, 124 may be used as a compensation volume 113 to reduce overpressure in the air dryer 110. Compressed air 52 can thus be discharged from the air dryer 110, which represents an overpressure volume 109, into the compensation volume 113 in order to reduce the pressure in the overpressure volume 109. It is preferred if the air springs 118, 120, 122, 124 are filled with compressed air from the overpressure volume 109 in a chronologically consecutive manner individually or in groups of two air springs 118, 120, 122, 124. It is in particular preferred if a comparatively small compressed air quantity is applied in each case to the air springs 118, 120, 122, 124 in a filling step. It may be advantageous if a comparatively small compressed air quantity is applied to each of the air springs 118, 120, 122, 124 in a plurality of filling steps. Compressed air can thus be applied to the air springs 118, 120, 122, 124 multiple times in a specific sequence in a chronologically consecutive manner individually or in groups of two air springs 118, 120, 122, 124. This makes it possible to prevent the vehicle from being raised abruptly. If the pressure reduction in the overpressure volume 109 is not sufficient, compressed air from the overpressure volume 109 can additionally be discharged into an intermediate storage means 107. In the present case, the intermediate storage means 107 is formed by the compressing means. However, other components of the compressed air supply installation 102 may also be used as the intermediate storage means 107. The intermediate storage means 107 then forms the compensation volume 113 together with the air springs 118, 120, 122, 124.

It is possible that, during operation of the compressed air supply installation 102, compressed air is initially applied to the air springs 118, 120, 122, 124 and the intermediate storage means 107 is subsequently filled with compressed air from the overpressure volume 109 in a final step directly before the compressed air supply installation 102 is vented. As a result, a pressure level below the pressure level of the air springs 118, 120, 122, 124 can be achieved in the overpressure volume 109 and in particular at the exhaust of the compressed air supply installation 102. The compressed air supply installation 102 can then be vented into the surroundings at an even further reduced pressure at the exhaust. Venting the compressed air supply installation 102 thus results in a comparatively even lower noise level.

The air springs 118, 120, 122, 124 are each pneumatically connected to the air distributor module 108 via the air spring valves 126, 128, 130, 132 and via the gallery 129. When the air spring valves 126, 128, 130, 132 are open, the air springs 118, 120, 122, 124 can be filled with or evacuated of compressed air 54 accordingly.

Figure 1B:
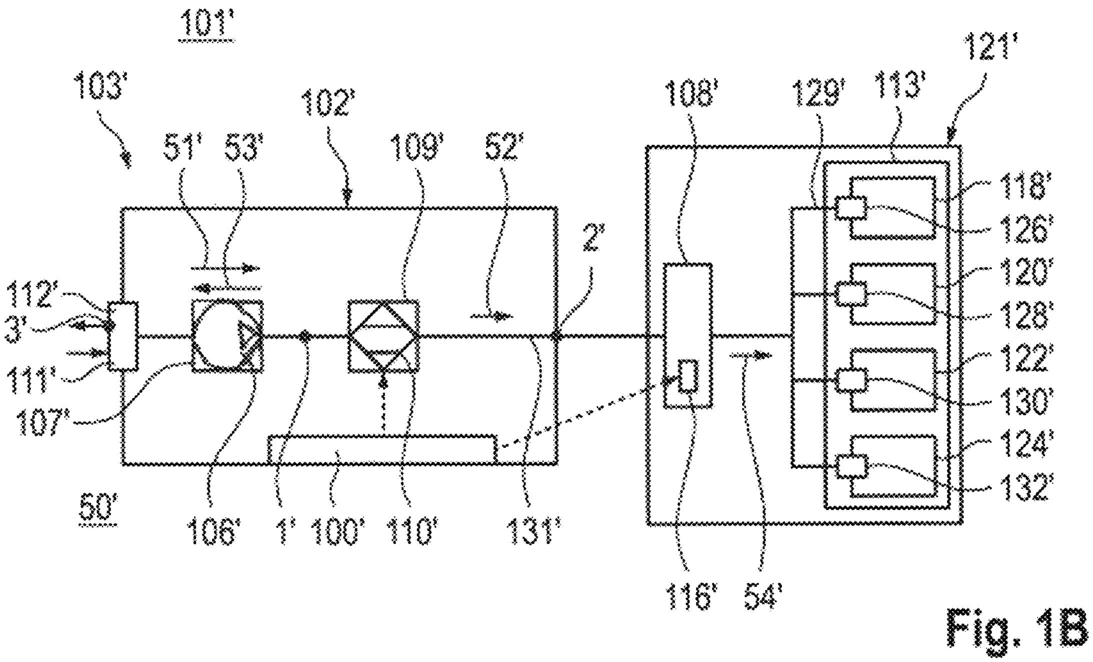
FIG. 1B schematically shows a compressed air supply installation, which is pneumatically connected to an air spring installation and in which the intake and exhaust are realized via a common port.

FIG. 1B schematically shows a compressed air supply installation 102', which is pneumatically connected to an air spring installation 121' and in which a separate pneumatic line is not provided for the exhaust 3'. The compressed air supply installation 102' and the air spring installation 121' together form a pneumatic system 103'.

The compressed air supply installation 102 described in relation to FIG. 1A differs in particular from the compressed air supply installation 102' in that, in the compressed air supply installation 102, a separate pneumatic line is not provided for the exhaust 3.

Accordingly, the air dryer 110' of the compressed air supply installation 102' is pneumatically connected to the compressing means 106' and the air distributor module 108'. The compressing means 106' is in turn pneumatically connected to the compressing means port 1' and the exhaust 3' via a pneumatic line. Air 51' drawn in from the surrounding atmosphere 50' by the compressing means 106' is conducted via a compressing means port 1' to the air dryer 110' and is dried by the latter. The air which has been compressed is transferred from the air dryer 110' as dry compressed air 52' via the compressed air supply port 2' to the air distributor module 108' of the air spring installation 121'.

The air spring installation 121' includes the air springs 118', 120', 122', 124', to which compressed air 52' can be applied by opening the respective air spring valves 126', 128', 130', 132' in order thus to raise the vehicle 101'. The air springs 118, 120, 122, 124 can be used as a compensation volume 113' to reduce a pressure in the air dryer 110', which represents an overpressure volume 109'. If the pressure in the air dryer 110' is to be reduced further still, an intermediate storage means 107' of the compressed air supply installation 102' may also be used, in addition to the air springs 118', 120', 122', 124', as a compensation volume 113'. The intermediate storage means 107' which may be used is for example the compressing means 106' of the compressed air supply installation 102'.

The compressed air supply installation 102' includes a control device 100', which is connected to a pressure sensor 116' of the air distributor module 108' via a data connection 55'. The pressure sensor 116' is configured to measure a level of the pressure in the air distributor module 108' and to transmit a pressure sensor signal, which represents the level detected of the pressure in the air distributor module 108', to the control device 100' via the data connection 55'. The control device 100' is connected to the compressing means 106' via a control line 56' in order to control the compressing means 106'. The compressing means 106' can be controlled by the control device 100' on the basis of the level, measured by the pressure sensor 116', of the pressure in the air distributor module 108'.

Figure 1C:
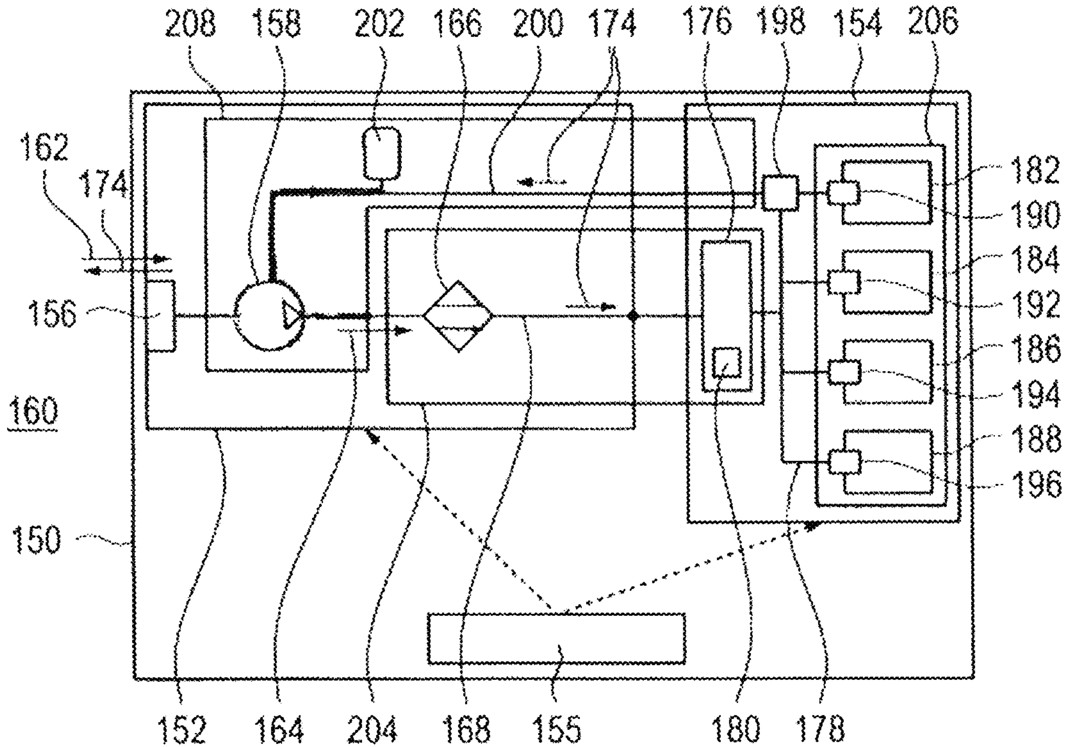
FIG. 1C schematically shows a pneumatic system having a compressed air supply installation and an air spring installation, wherein the air springs of the air spring installation are used as a compensation volume.
Figure 1D:
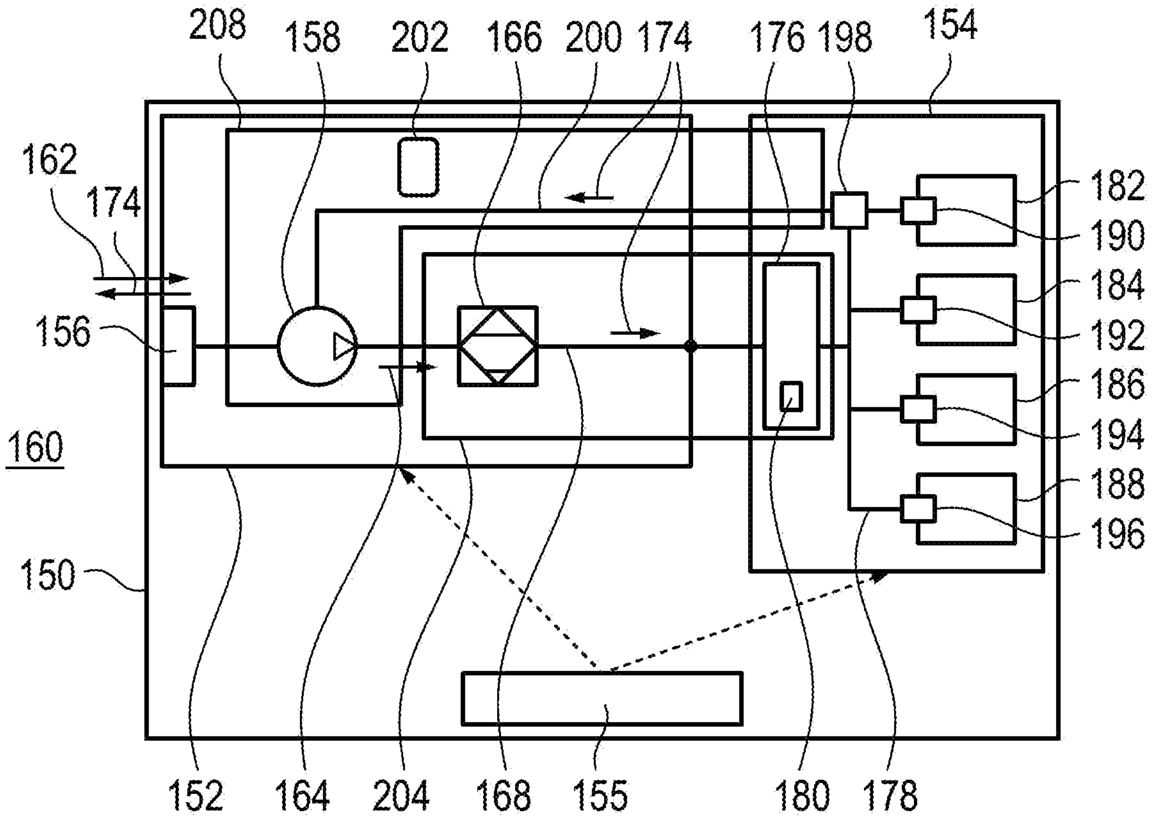
FIG. 1D schematically shows a pneumatic system having a compressed air supply installation and an air spring installation, wherein the return flow line with the auxiliary storage means and the compressing means are used as a compensation volume.
Figure 1E:
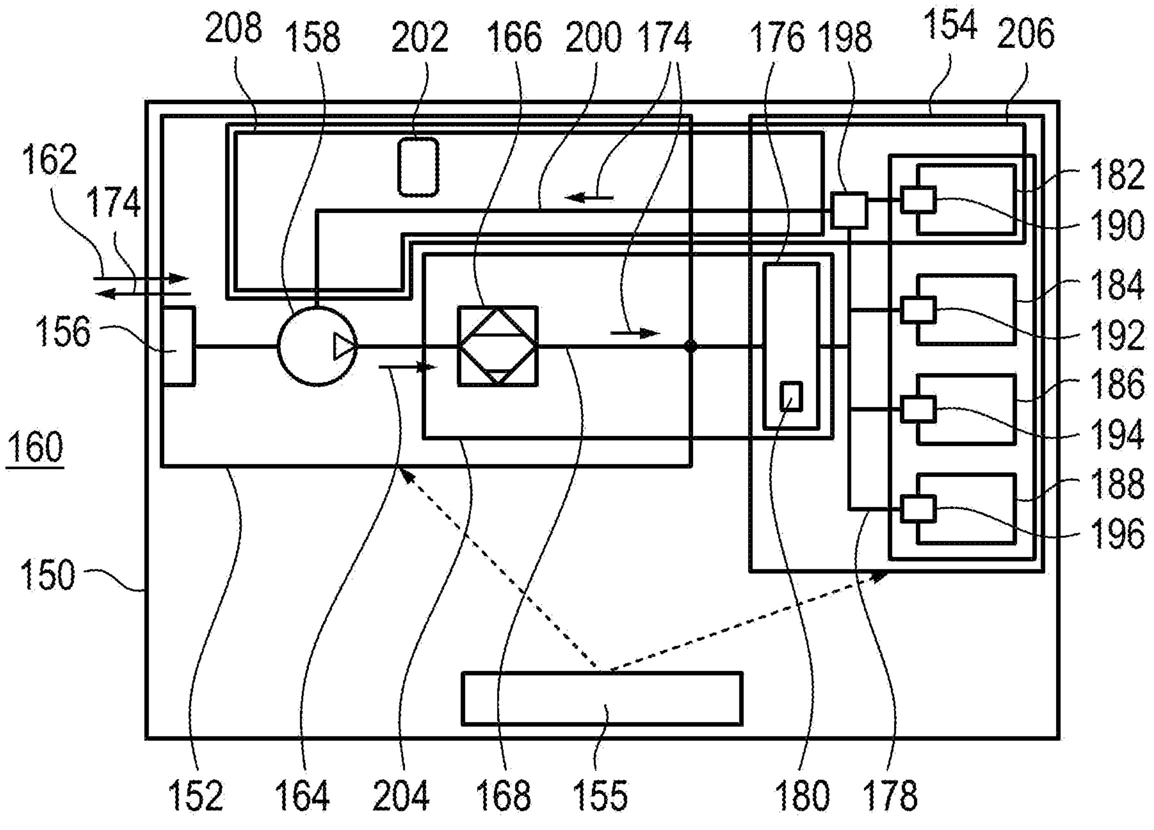
FIG. 1E schematically shows a pneumatic system having a compressed air supply installation and an air spring installation, wherein a first air spring and the return flow line with the auxiliary storage means are used as a compensation volume.

FIG. 1C, FIG. 1D and FIG. 1E schematically show a pneumatic system 150 in different operating situations. The pneumatic system 150 has a compressed air supply installation 152 and an air spring installation 154. The compressed air supply installation 152 and the air spring installation 154 are controlled via a control device 155.

The compressed air supply installation 152 has an intake and an exhaust, which are realized via a common compressed air valve 156. Using a compressing means 158, air 162 is drawn in from the surroundings 160, compressed and transferred as compressed air 164 to an air dryer 166. The air dryer 166 dries the air which has been compressed. The air dryer 166 is arranged in a pneumatic main line 168, which extends between a compressing means port 170 and a compressed air supply port 172. The air dryer 166 is connected to the compressing means 158 via the compressing means port 170. The air dryer 166 is connected to the air spring installation 154 via the compressed air supply port 172. Compressed air 174 dried by the air dryer 166 is transferred to the air spring installation 154 via the compressed air supply port 172.

Compressed air 174 transferred to the air spring installation 154 is transferred to a gallery 178 via an air distributor module 176. A pressure sensor 180, which measures the pressure in the air distributor module 176, is arranged in the air distributor module 176.

The compressed air 174 is distributed to the air springs 182, 184, 186, 188 of the air spring installation 154 via the gallery 178. For this purpose, the air spring valves 190, 192, 194, 196 of the air springs 182, 184, 186, 188 are opened.

To fill the air springs 182, 184, 186, 188 with compressed air 174, the compressed air valve 156 is closed and the compressing means 158 is set to idle mode.

To vent the air springs 182, 184, 186, 188, the corresponding air spring valves 190, 192, 194, 196 and a return flow valve 198 are opened. Compressed air 174 then returns to the compressing means 158 via a return flow line 200. The return flow line 200 is a pneumatic line provided in addition to the pneumatic main line 168.

Pneumatically attached to the return flow line 200 is an auxiliary storage means 202, in which compressed air 174 can be stored in order to reduce the pressure in the rest of the compressed air supply installation 152.

To vent the compressed air supply installation 152, the compressed air valve 156 is opened, so that compressed air 174 can be discharged into the surroundings 160.

FIG. 1C shows an operating situation in which air dryer 164 and air distributor module 176 form an overpressure volume 204. During operation of the pneumatic system 150 the pressures in this overpressure volume 204 may reach up to 18 bar. In order to reduce overpressure in the overpressure volume 204 without having to vent into the surroundings 160, the overpressure is to be discharged into a compensation volume 206. In the operating situation shown in FIG. 1C, the compensation volume 206 is formed by the air springs 182, 184, 186, 188. To reduce the pressure in the overpressure volume 204, compressed air 174 is distributed to the air springs 182, 184, 186, 188 in a chronologically consecutive manner individually or in groups of two air springs 182, 184, 186, 188. In this case it is preferred if compressed air 174 is initially discharged into the air spring 182, 184, 186, 188 having the smallest pressure difference to the pressure in the air distributor module 176.

Compressed air 174 can advantageously additionally be discharged into an intermediate storage means 208. This is in particular advantageous when the pressure in the air springs 182, 184, 186, 188 cannot be reduced to a sufficient extent or sufficiently rapidly. In the present case, the intermediate storage means 208 includes a connecting volume. The connecting volume may be formed by the return flow line 200 alone or by the return flow line 200 and an auxiliary storage means 202 which may optionally advantageously also be available. The auxiliary storage means 202 can be provided for this purpose and can be pneumatically connected to the return flow line 200 in a selectable manner; for example via a pneumatic switching valve (not explicitly shown here) or a check valve or another suitable pneumatic actuator. The auxiliary storage means 202 can also be provided so as to be freely pneumatically accessible and can be pneumatically connected, for example via a suitable throttle, to the return flow line 200. In addition to the connecting volume, the intermediate storage means 208 may also be formed using the volume of the compressing means 158, that is, in addition to the return flow line 200 and in addition to the optional auxiliary storage means 202; that is, the intermediate storage means may include the return flow line 200, the optionally available auxiliary storage means 202 and the compressing means 158. In this respect, the connecting volume may in principle be understood to mean a pneumatic connection (optionally with an additionally available auxiliary volume) between the return flow valve 198 and the compressing means 158; in particular, the connecting volume includes the return flow line 200 and the optionally available auxiliary storage means 202. The intermediate storage means 208 may be formed by the connecting volume alone or solely by the volume or a portion of the volume of the compressing means 158 or a combination thereof. These variants of the intermediate storage means 208, in particular of the connecting volume, may be provided independently of the embodiment explained here by way of example for developing the concept of the disclosure, and in particular may also be provided in the other embodiments explained in this application.

The compensation volume 206 may also, as shown in FIG. 1D, include only the intermediate storage means 208 and not the air springs 182, 184, 186, 188. As a further alternative, the compensation volume 206 may include, for example, only one or two of the air springs 182, 184, 186, 188 rather than all of the air springs 182, 184, 186, 188. For example, FIG. 1E shows an operating situation in which the compensation volume 206 is formed by an intermediate storage means 208 and only one air spring 182, wherein the intermediate storage means 208 includes only a connecting volume formed by the return flow line 200 and the auxiliary storage means 202. These variants of the compensation volume 206 may be provided independently of the embodiment explained here by way of example for developing the concept of the disclosure, and in particular may also be provided in the other embodiments explained in this application.

Figure 2:
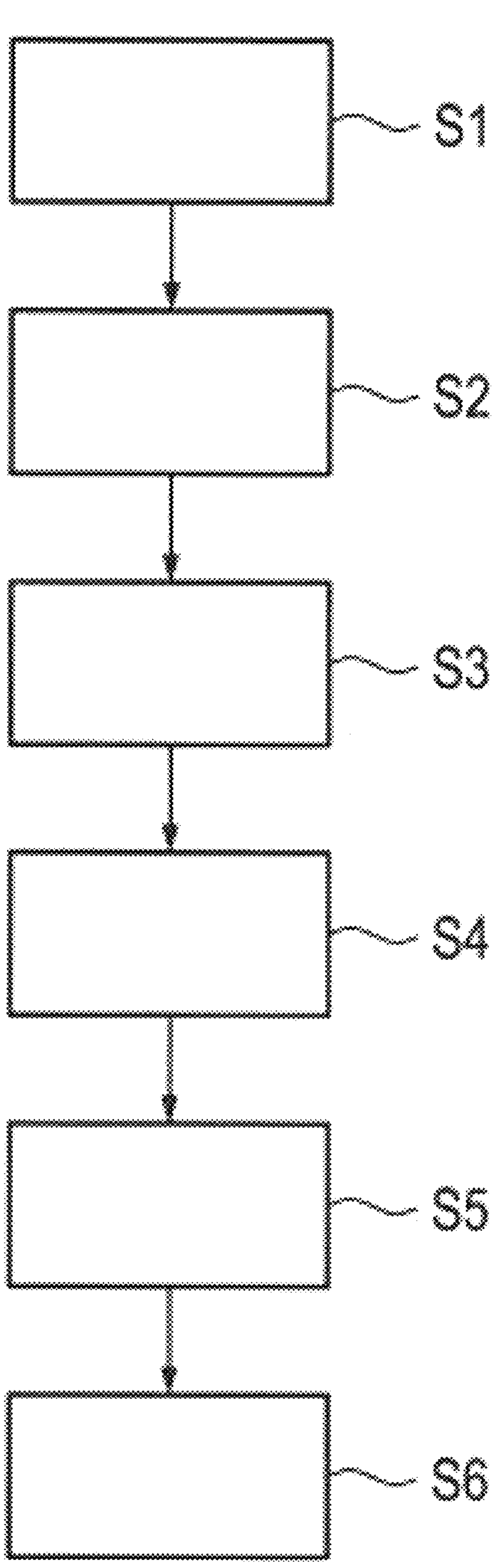
FIG. 2 schematically shows a flowchart for a method for operating a compressed air supply installation.

FIG. 2 schematically shows a flowchart for a method, known per se, for operating a compressed air supply installation. The method makes it possible in particular to reduce the pressure at the exhaust of the compressed air supply installation so that the compressed air supply installation can be vented at a comparatively lower pressure. Since venting is carried out at a comparatively lower pressure, the noise level generated when venting the compressed air supply installation is also comparatively lower.

In the method, a compressing means of the compressed air supply installation is initially set to idle mode (step S1) and the exhaust valve of an exhaust of the compressed air supply installation is closed (step S2). When the compressing means is in idle mode and the exhaust valve is closed, the air spring valves are opened (step S3). By opening the air spring valves, compressed air flows from the compressed air supply installation into the air springs of a pneumatic air spring installation which is connected to the compressed air supply installation. An equilibrium pressure is then established in the compressed air supply installation, this equilibrium pressure being comparatively lower than the pressure prevailing in the compressed air supply installation before the air spring valves were opened (step S4). After an equilibrium pressure has been established in the compressed air supply installation and the air spring installation, the air spring valves are closed again (step S5). In the method, the air spring valves are all opened and closed together. This raises the vehicle by applying compressed air to the air springs in a single step, which can have a negative effect on the driving characteristics of the vehicle.

After the air spring valves have been closed again, the exhaust valve is opened (step S6) in order to vent the compressed air supply installation at a comparatively lower pressure at the exhaust.

Figure 3:
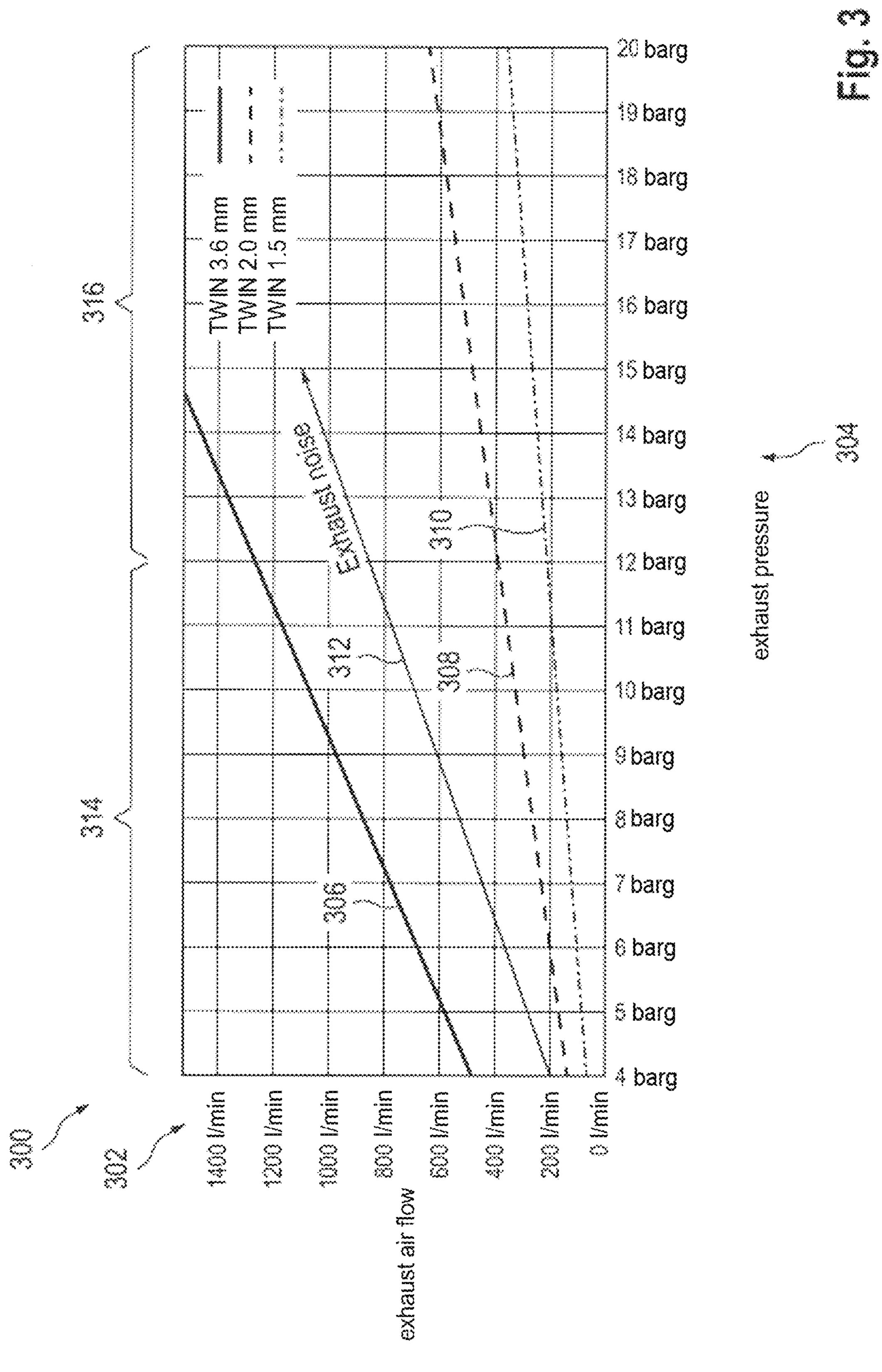
FIG. 3 shows a graph which indicates the compressed air quantity emitted into the surrounding atmosphere relative to the pressure at the exhaust for different throttle diameters of the air dryer.

FIG. 3 shows a graph 300 which indicates the compressed air quantity 302 emitted into the surrounding atmosphere relative to the pressure at the exhaust 304, for different throttle diameters of an air dryer.

The graph 300 shows three curves 306, 308, 310, which show the increase in the compressed air quantity 302 in relation to the pressure 304 at the exhaust for different throttle diameters of an air dryer in each case.

All three curves 306, 308, 310 show a linear relationship between the level of the compressed air quantity 302 emitted as a function of the level of the pressure at the exhaust 304.

In the graph, the curve 306 represents the linear relationship between the level of the compressed air quantity 302 emitted as a function of the level of the pressure at the exhaust 304 for a throttle diameter of 3.6 mm.

The curve 308 represents the linear relationship between the level of the compressed air quantity 302 emitted as a function of the level of the pressure at the exhaust 304 for a throttle diameter of 2.0 mm.

The curve 310 represents the linear relationship between the level of the compressed air quantity 302 emitted as a function of the level of the pressure at the exhaust 304 for a throttle diameter of 1.5 mm.

In the graph, the increase in the noise level at the exhaust is also symbolically illustrated with an arrow 312. The arrow 312 indicates that, when venting a compressed air supply installation and, in particular, the air dryer and/or the air distributor module of the compressed air supply installation, as the compressed air quantity 302 emitted rises, accompanied by a correspondingly high pressure at the exhaust 304, the noise level at the exhaust also rises accordingly.

The illustrated pressure range of 4 bar to 20 bar can be divided into two pressure sub-ranges, wherein the first pressure sub-range 314 represents the range of 4 bar to 12 bar and the second pressure sub-range 316 represents the range of 12 bar to 20 bar. In particular in the pressure sub-range between 12 bar and 20 bar, venting the compressed air supply installation results in a comparatively high noise level. It is therefore preferable not to vent the compressed air supply installation when the pressure at the exhaust falls within this second pressure sub-range 316. If the pressure at the exhaust falls within the second pressure sub-range 316 and it is nevertheless necessary to vent the air dryer and/or the air distributor module in order to reduce the pressure prevailing there, it is therefore preferred to divert compressed air from the air dryer and/or the air distributor module into the air springs of an air spring installation in order thus to lower the pressure in the air dryer and/or the air distributor module to such an extent that the pressure at the exhaust falls within the first pressure sub-range 314. As soon as the pressure at the exhaust falls within the first pressure sub-range 314, the compressed air supply installation can be vented without generating a noise level which exceeds a critical, for example predefined, threshold.

Figure 4:
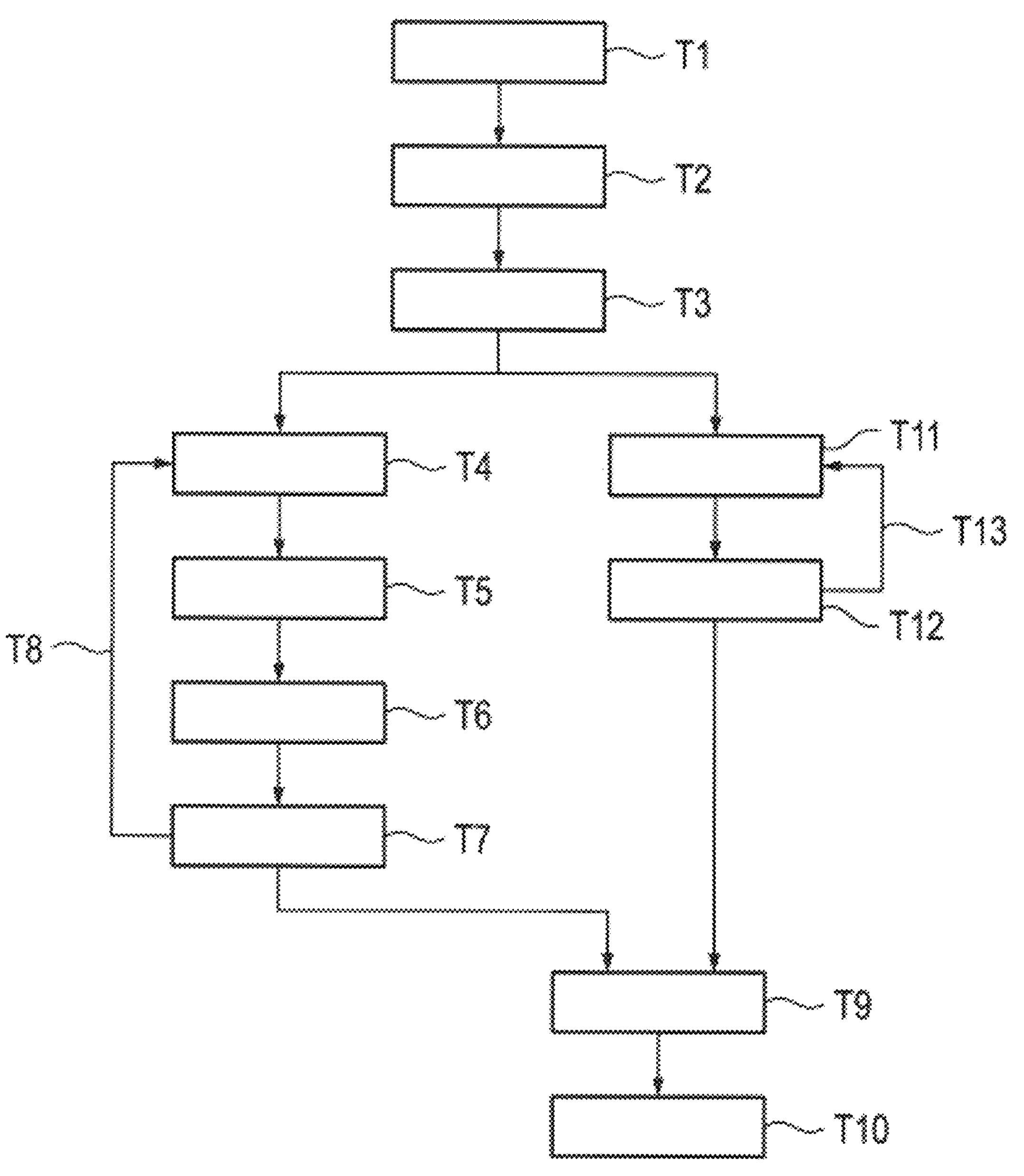
FIG. 4 schematically shows a flowchart for a method for operating a compressed air supply installation, in which compressed air is discharged into the air springs.

FIG. 4 schematically shows a flowchart for a method for operating a compressed air supply installation, in which compressed air is discharged into the air springs individually in a chronologically consecutive manner or in a chronologically consecutive manner in groups of two air springs.

In the method, the compressing means of the compressed air supply installation is initially set to idle mode (step T1) and the exhaust valve of the exhaust of the compressed air supply installation is closed (step T2).

A control device, for example the control device of the compressed air supply installation, is used to specify or define (step T3) a compressed air quantity in which and/or a period of time for which compressed air from the air dryer and/or the air distributor module of the compressed air supply installation is to be applied to the air springs of an air spring installation.

In a first alternative of the method, compressed air from the air dryer and/or the air distributor module is applied to the air springs of the air spring installation in a chronologically consecutive manner.

Accordingly, the air spring valve of a first air spring is initially opened and compressed air is applied (step T4) to the first air spring in a compressed air quantity specified for this first air spring and/or for a period of time predefined for this first air spring. After being filled with compressed air, the air spring valve of the first air spring is closed again and the air spring valve of a second air spring is opened (step T5) in order to fill this second air spring with compressed air. A compressed air quantity in which and/or period of time for which the second air spring is filled with compressed air can also be individually specified or predefined for the second air spring. When the air spring valve of the second air spring is closed, compressed air is applied (step T6) to a third air spring of the air spring installation by opening the air spring valve of this third air spring. A compressed air quantity or a period of time can also be specified or predefined for the third air spring. The air spring valve of the third air spring is subsequently closed again and the air spring valve of the fourth air spring of the vehicle is opened in order to fill this air spring with compressed air (step T7), for example in a specified compressed air quantity and/or for a predefined period of time.

If the compressed air quantity discharged from the air dryer and/or the air distributor module into the air springs is not sufficient to lower the pressure in the air dryer and/or the air distributor module by the desired amount, the air springs can be filled with compressed air again in a specified compressed air quantity and/or for a predefined period of time until the pressure at the exhaust of the compressed air supply installation has reached a specific value (step T8). This allows the pressure at the exhaust to be successively reduced in a multiplicity of steps until the pressure at the exhaust of the compressed air supply installation is below a specific, for example specified, threshold. The threshold is in particular specified in such a way that only a low noise level is generated when the compressed air supply installation is vented.

After the air springs have been filled with compressed air and all air spring valves are closed, the compressing means of the compressed air supply installation can be reactivated (step T9) and the exhaust valve opened (step T10). The compressed air supply installation is then vented. A portion of the compressed air emitted into the surrounding atmosphere is stored in the activated compressing means, so that the compressed air quantity actually emitted into the surrounding atmosphere is additionally reduced.

In addition, it may be provided in the method that the exhaust valve of the compressed air supply installation is opened and closed multiple times during venting, for example at a specified frequency, so that the compressed air is emitted into the surrounding atmosphere in a plurality of steps. This can further lower the noise level generated when venting.

In a second alternative of the method, the air springs of the air spring installation are filled with compressed air together in groups of two air springs. Accordingly, the air spring valves of two air springs are opened simultaneously (step T11), wherein the two air spring valves of the two remaining air springs are closed. Compressed air is subsequently applied to the two remaining air springs, wherein during this process the two air spring valves of the air springs which have already been filled are closed (step T12).

It is preferred that a group of two air springs includes the two air springs of a front axle or a rear axle of a vehicle. According to this second alternative of the method, compressed air may for example initially be applied to the two air springs of the front axle of the vehicle and chronologically subsequently applied to the two air springs of the rear axle, or vice versa.

If compressed air is applied to the air springs in groups of two air springs, it is again preferred if compressed air is applied to the air springs in a specified compressed air quantity and/or for a predefined period of time.

After the air springs have each been filled once with compressed air in groups of two air springs, the former can be filled with compressed air again, for example in a specified compressed air quantity and/or for a predefined period of time (step T13). Compressed air can accordingly be applied to the air springs repeatedly until the pressure at the exhaust has fallen below a specific, in particular critical, threshold.

After the pressure at the exhaust has fallen below the threshold, the compressed air supply installation can be vented as described above by carrying out the steps T9 and T10.

As an alternative or in addition to sequentially filling the air springs in a consecutive manner individually or in groups of two air springs, it may be provided in the method that compressed air is discharged into the compressing means and/or into a connecting volume. If compressed air is additionally discharged into the compressing means and/or into the connecting volume, the pressure in the air dryer can be reduced further still and the compressed air supply installation can be vented at an even lower noise level.

Figure 5A:
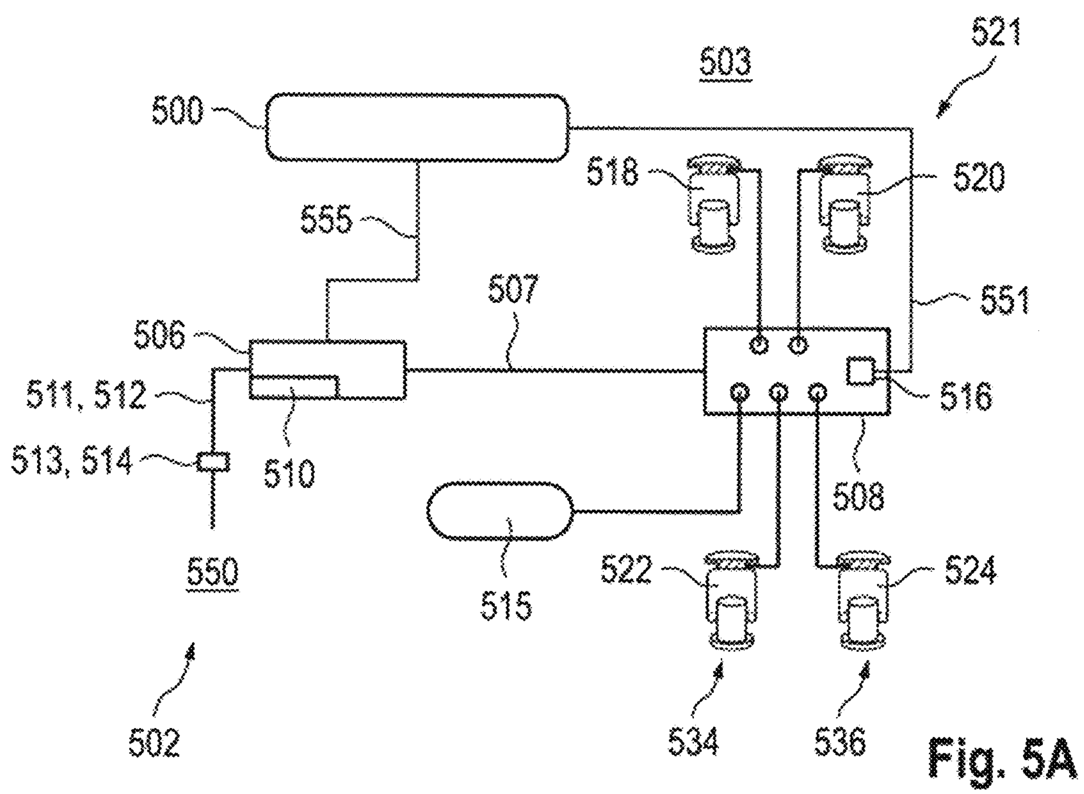
FIG. 5A schematically shows a compressed air supply installation, which is pneumatically connected to an air spring installation and is realized as an open system.

FIG. 5A schematically shows a compressed air supply installation 502, which is pneumatically connected to an air spring installation 521 and is realized as an open system.

The compressed air supply installation 502 includes an intake 511 and an exhaust, which are realized via a common port. The compressed air supply installation 502 also includes an air dryer 510 and a compressing means 506. When the compressing means 506 draws in air from the surrounding atmosphere 550, this air flows through the intake 511 and through the air dryer 510. The air dried by the air dryer 510 is compressed by the compressing means 506 and conducted as compressed air via a pneumatic main line 507 to the air distributor module 508 of the air spring installation 521.

The air distributor module 508 includes a pressure sensor 516, which detects a level of the pressure in the air distributor module 508. The pressure sensor 516 is connected to the control device 500 of the compressed air supply installation 502 via a data connection 551. A pressure sensor signal can be transmitted by the pressure sensor 516 to the control device 500 via the data connection 551. The pressure sensor signal represents in particular the level of the pressure detected by the pressure sensor 516. The control device 500 is also connected to the compressing means 506 via control lines 555, so that the control device 500 can control the compressing means 506 via transmitted control commands. In particular, the control device 500 can control the compressing means 506 on the basis of the level, detected by the pressure sensor 516, of the pressure in the air distributor module 508.

The air distributor module 508 includes five 2/2-way solenoid valves. One of these 2/2-way solenoid valves is assigned to a compressed air reservoir 515 of the compressed air supply installation 502. Compressed air can be temporarily stored in the compressed air reservoir 515 and used, for example, for filling air springs as required.

The remaining four 2/2-way solenoid valves are assigned as air spring valves to the four air springs 518, 520, 522, 524 respectively of the air spring installation 521.

Via the air distributor module 508, compressed air can thus be discharged from the compressing means 506 via the pneumatic main line 507 into the air springs 518, 520, 522, 524 by opening the air spring valves.

Two of the air springs 518, 522 are located on the front axle 534 of the vehicle 503 and the other two air springs 520, 524 are located on the rear axle 536 of the vehicle 503.

Figure 5B:
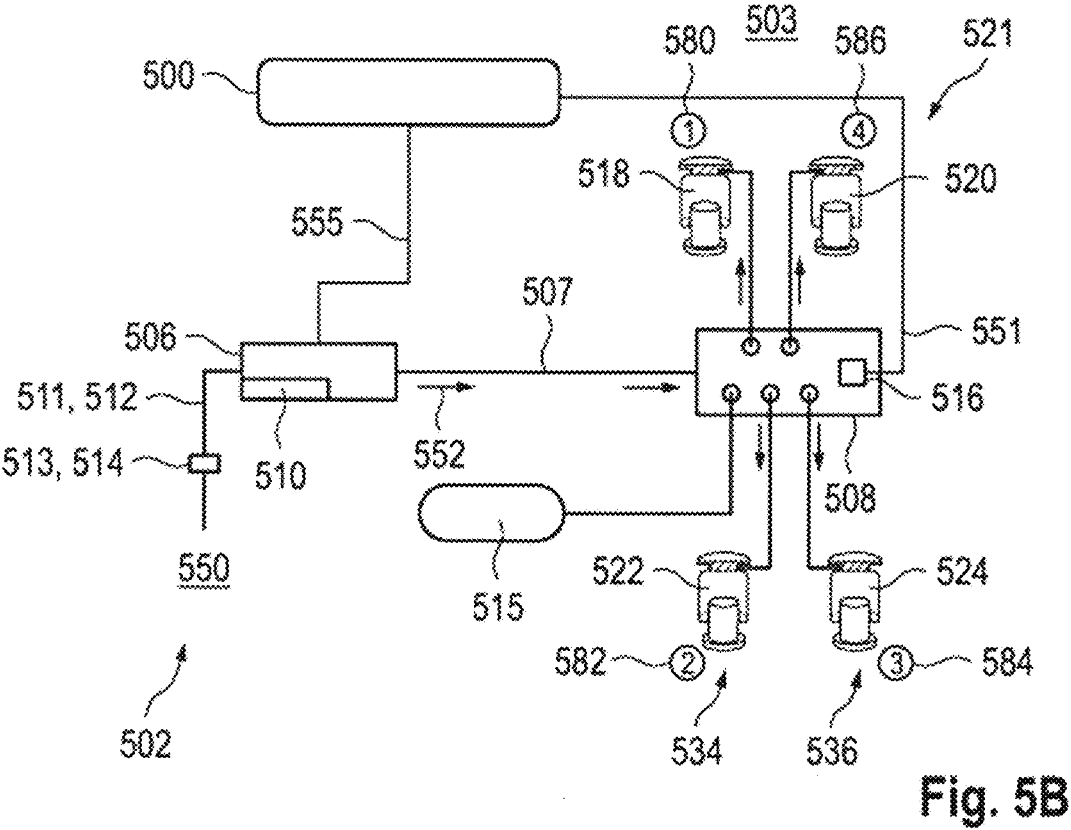
FIG. 5B schematically shows the compressed air supply installation illustrated in FIG. 5A and depicts the diversion of compressed air into the air springs.

FIG. 5B schematically shows the compressed air supply installation 502 described in relation to FIG. 5A. In addition, FIG. 5B uses arrows to depict the diversion of compressed air 552 into the air springs 518, 520, 522, 524.

As in the method described in relation to FIG. 4, the compressed air is not distributed simultaneously to the air springs 518, 520, 522, 524. Instead, the compressed air 552 is distributed to the air springs 518, 520, 522, 524 individually in a chronologically consecutive manner. In particular, compressed air 552 is applied to each of the air springs 518, 520, 522, 524 in a chronologically consecutive manner in a specified compressed air quantity and/or for a predefined period of time.

According to FIG. 5B shown here, compressed air is initially applied to the air spring 518, which is located, as viewed in the direction of travel of the vehicle 503, to the right on the front axle 534. Compressed air 552 is subsequently applied to the air spring 522 arranged, as viewed in the direction of travel of the vehicle 503, to the left on the front axle 534. Alternatively, compressed air 552 could be applied jointly, that is, simultaneously, to the two air springs of the front axle 518, 522 as a group of two air springs.

After compressed air 552 has been applied to the air springs 518, 522 of the front axle 534, compressed air 552 is applied to the air springs 520, 524 of the rear axle 536. For example, as shown in FIG. 5B, compressed air 552 can initially be applied to the air spring 524, which is located, as viewed in the direction of travel of the vehicle 503, to the left on the rear axle 536. Compressed air 552 is then subsequently applied to the air spring 520, which is located, as viewed in the direction of travel of the vehicle 503, to the right on the rear axle 536.

Alternatively, compressed air 552 can also be applied simultaneously to the two air springs 520, 524 of the rear axle 536 as a group of two air springs 520, 524.

If compressed air 552 is applied to the air springs 518, 520, 522, 524 in groups of two air springs 518, 520, 522, 524, this is carried out in a chronologically consecutive manner. For example, compressed air 552 could be applied initially to the two air springs of the front axle 518, 522 and subsequently to the two air springs 520, 524 of the rear axle 536, or vice versa. When compressed air 552 is applied to the air springs 518, 520, 522, 524 in groups of two air springs 518, 520, 522, 524, it is again preferable to specify a compressed air quantity in which and/or define a period of time for which compressed air is applied to the air springs 518, 520, 522, 524.

Figure 5C:
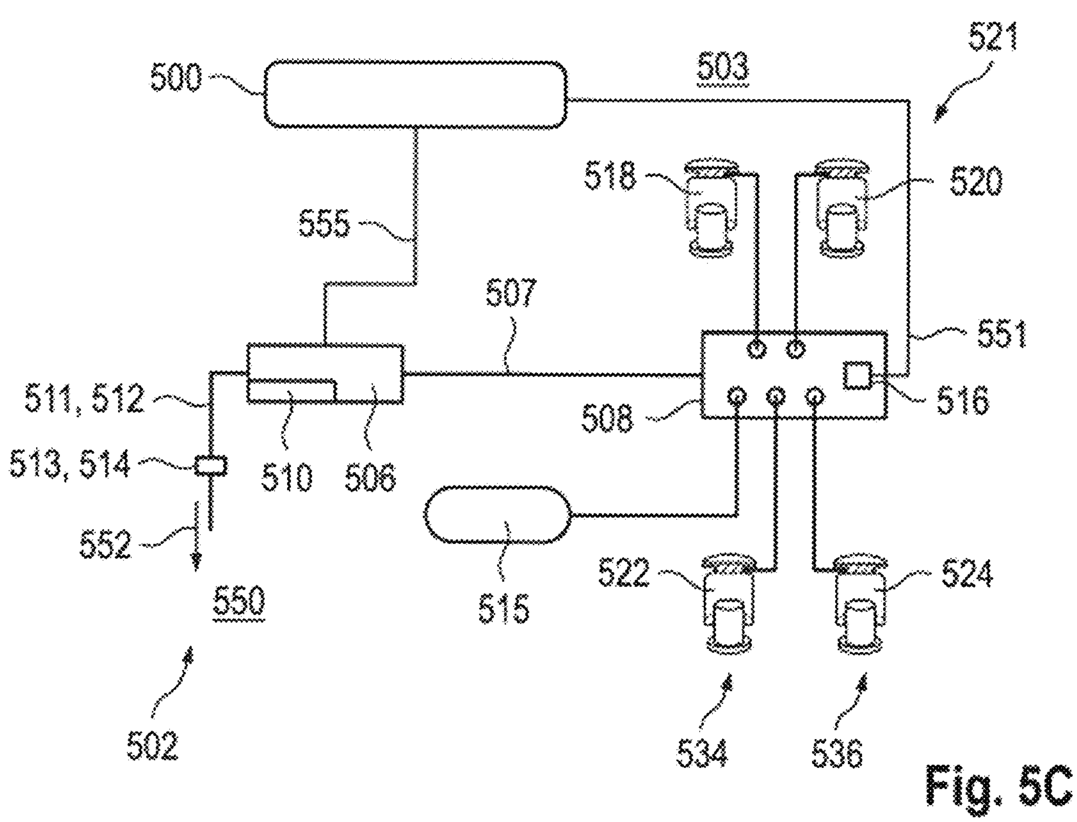
FIG. 5C schematically shows the compressed air supply installation illustrated in FIGS. 5A and 5B and depicts the compressed air supply installation being vented into the surrounding atmosphere.

FIG. 5C schematically shows the compressed air supply installation 502 described in relation to FIGS. 5A and 5B, with the difference that FIG. 5C uses arrows to depict the compressed air supply installation 502 being vented into the surrounding atmosphere 550.

To vent the compressed air supply installation 502, the air spring valves in particular are closed. The exhaust valve of the exhaust 512 is subsequently opened to vent the compressed air supply installation 502.

In this process, the compressing means 506 can be activated in order to store a portion of the compressed air, so that less compressed air 552 is actually emitted into the surrounding atmosphere 550.

Figure 5D:
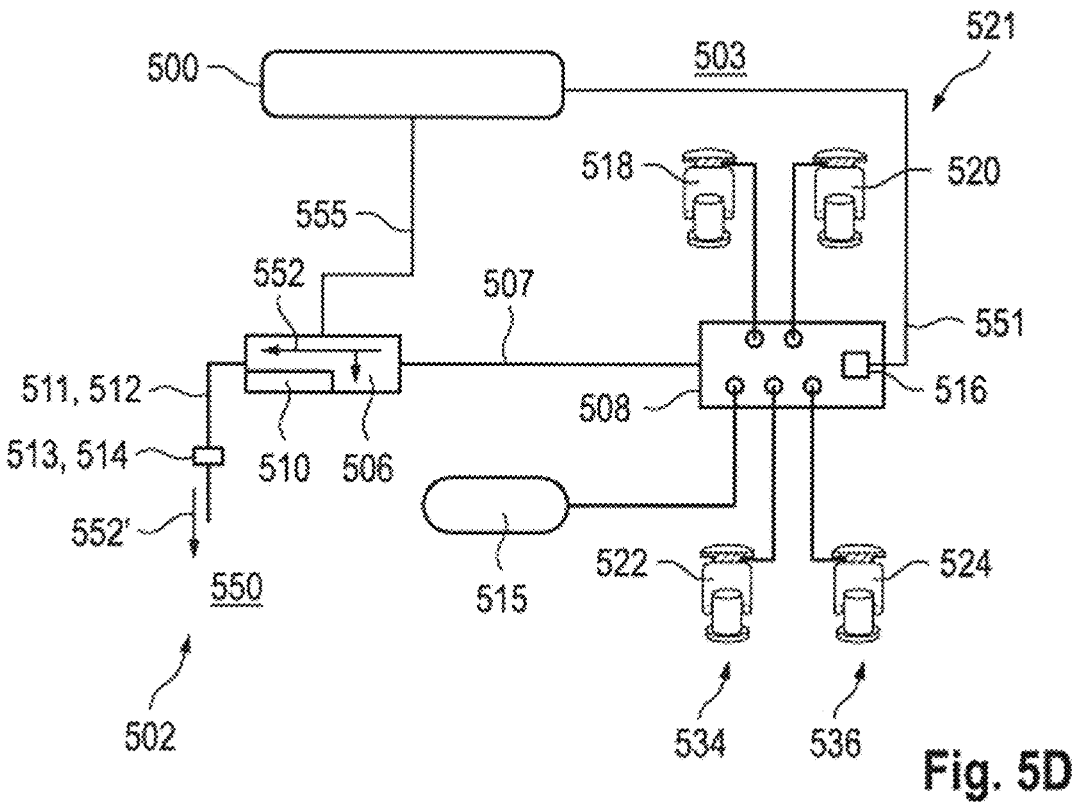
FIG. 5D schematically shows the compressed air supply installation illustrated in FIGS. 5A to 5C and depicts air being vented into the surrounding atmosphere, wherein a portion of the compressed air is stored in the compressing means during venting.

A corresponding operating situation is shown in FIG. 5D. FIG. 5D schematically shows the compressed air supply installation 500 described in relation to FIGS. 5A to 5C.

While the compressed air supply installation 500 is being vented, the compressing means 506 is activated in order to store a portion of the compressed air 552. A correspondingly smaller compressed air quantity 552' is then emitted into the surrounding atmosphere 550, so that the noise level generated when venting the compressed air supply installation 500 can be further reduced.

The exhaust valve of the exhaust 512 may in turn optionally be opened and closed again multiple times in succession, so that the compressed air 552 is emitted into the surrounding atmosphere 550 in comparatively smaller compressed air quantities on each occasion.

Figure 6A:
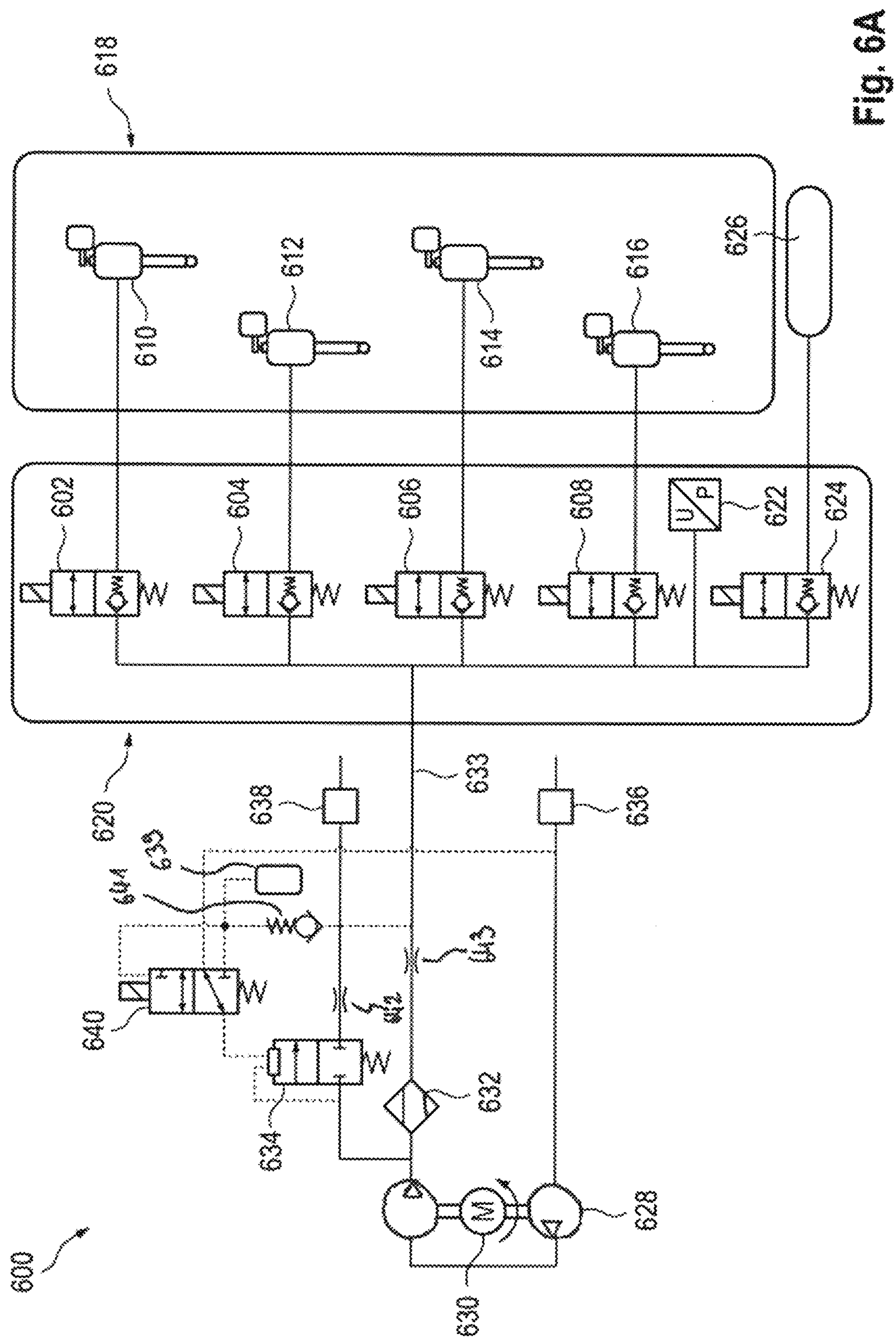
FIG. 6A shows a compressed air supply installation which is illustrated using circuit symbols and is pneumatically connected to air springs of an air spring installation via air spring valves.

FIG. 6A shows a schematically illustrated compressed air supply installation 600, which is pneumatically connected to air springs 610, 612, 614, 616 of an air spring installation 618 via air spring valves 602, 604, 606, 608. The air spring valves 602, 604, 606, 608 are configured as 2/2-way solenoid valves and form part of an air distributor module 620.

The air distributor module 620 further includes a pressure sensor 622 for detecting a level of a pressure in the air distributor module 620, and a gallery 627 for distributing the compressed air to the air springs 610, 612, 614, 616.

The air distributor module 620 includes a further 2/2-way solenoid valve, which is a reservoir valve 624. A compressed air reservoir 626 is attached to the reservoir valve 624 and can be filled with compressed air via the latter. Compressed air may also be withdrawn from the compressed air reservoir 626 and discharged for example into the air springs 610, 612, 614, 616. By filling the air springs 610, 612, 614, 616 with compressed air, the vehicle can be raised relative to the ground.

The compressed air supply installation 600 also includes a compressing means 628, which includes an electric motor 630 which can be used to drive, for example, pistons for compressing drawn-in air. During operation, compressed air is then discharged from the compressing means 628 via an air dryer 632 and via a pneumatic main line 633 to the air distributor module 620. Compressed air dried by the air dryer 632 is thus distributed to the air springs 610, 612, 614, 616 and the compressed air reservoir 626 via the air distributor module 620. The compressing means 628 draws in air from the surrounding atmosphere via an intake 636 provided with a filter. The filter prevents the compressing means 628 from being contaminated by particles.

The compressed air supply installation 600 also includes a relay valve 634, which is pneumatically connected to the compressing means 628 and the air dryer 632. The relay valve 634 is in turn pneumatically connected to an exhaust 638, which is equipped with silencers. The silencers make it possible to prevent the noise level from exceeding a specified threshold when the compressed air supply installation 600 is vented.

The compressed air supply installation 600 also includes an auxiliary storage means 639, to which compressed air can be applied via a valve 640 in order to lower the pressure in the air dryer 632 further. A check valve 641 is also provided. The compressed air supply installation 600 also has throttles 642, 643.

FIGS. 6B to 6G show the compressed air supply installation 600 described in relation to FIG. 6A in different operating situations in each case.

Figure 6B:
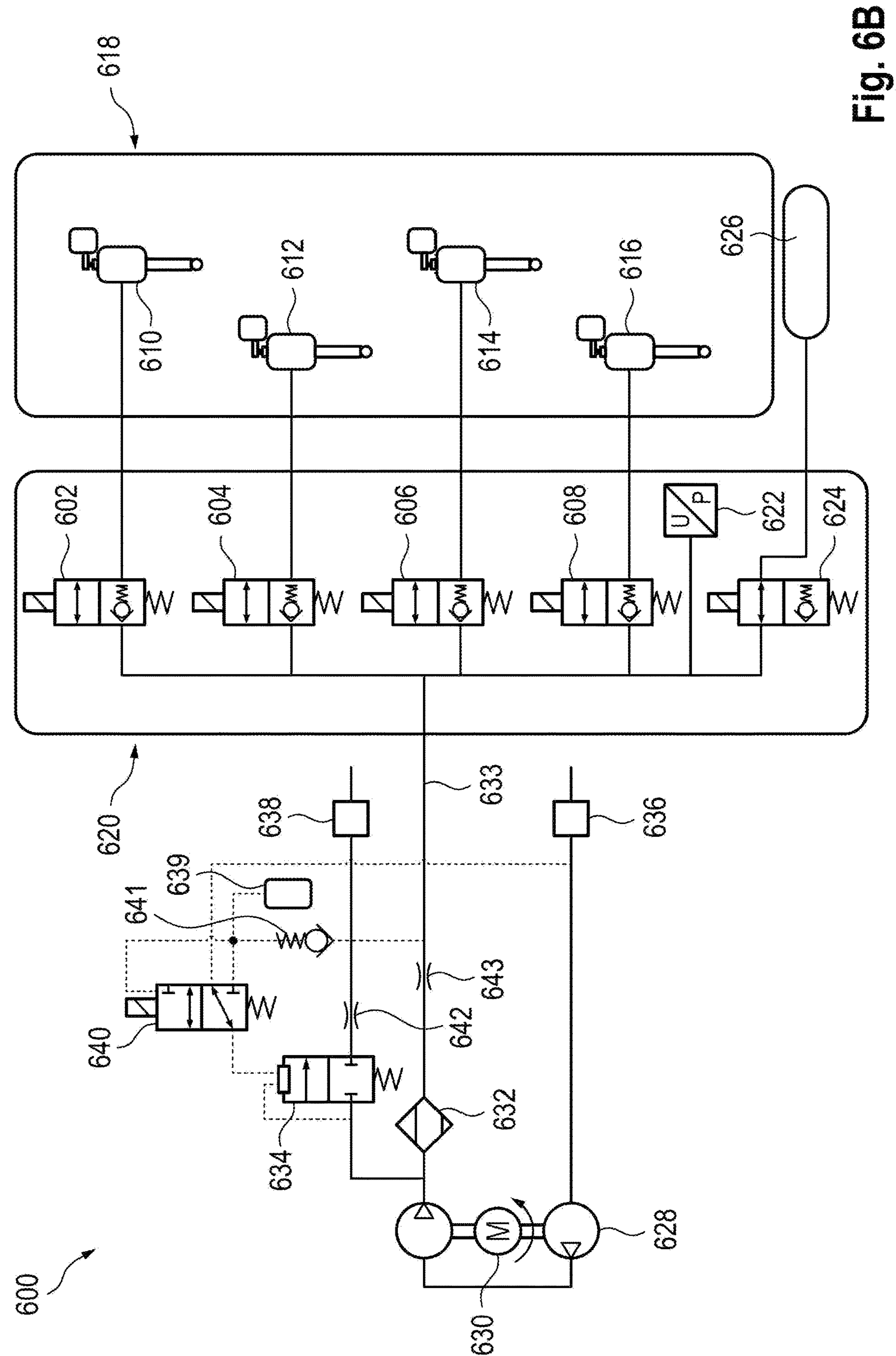
FIG. 6B shows the compressed air supply installation illustrated in FIG. 6A, wherein the valve of the reservoir is open in order to divert compressed air into the rest of the compressed air supply installation.

FIG. 6B shows the compressed air supply installation 600 illustrated in relation to FIG. 6A, wherein the reservoir valve 624 of the compressed air reservoir 626 is open in order to divert compressed air into the rest of the compressed air supply installation 600. Opening the reservoir valve 624 may cause the pressure in the rest of the compressed air supply installation 600 to rise. It is then desirable to reduce the pressure in the rest of the compressed air supply installation 600 again, for example by venting the compressed air supply installation 600 through the exhaust 638. If, however, the pressure in the compressed air supply installation 600 is comparatively high, and is for example between 12 bar and 20 bar, it is preferred that the pressure at the exhaust 638 is reduced before venting in order to prevent a comparatively high noise level when venting.

One option for reducing the pressure at the exhaust 638 is to fill the air springs 610, 612, 614, 616 of the air spring installation 618 in a chronologically consecutive manner with compressed air from the air dryer 632 and/or the air distributor module 620.

FIGS. 6C to 6F show the air springs 610, 612, 614, 616 of the air spring installation 618 being filled in a chronologically successive manner.

Figure 6C:
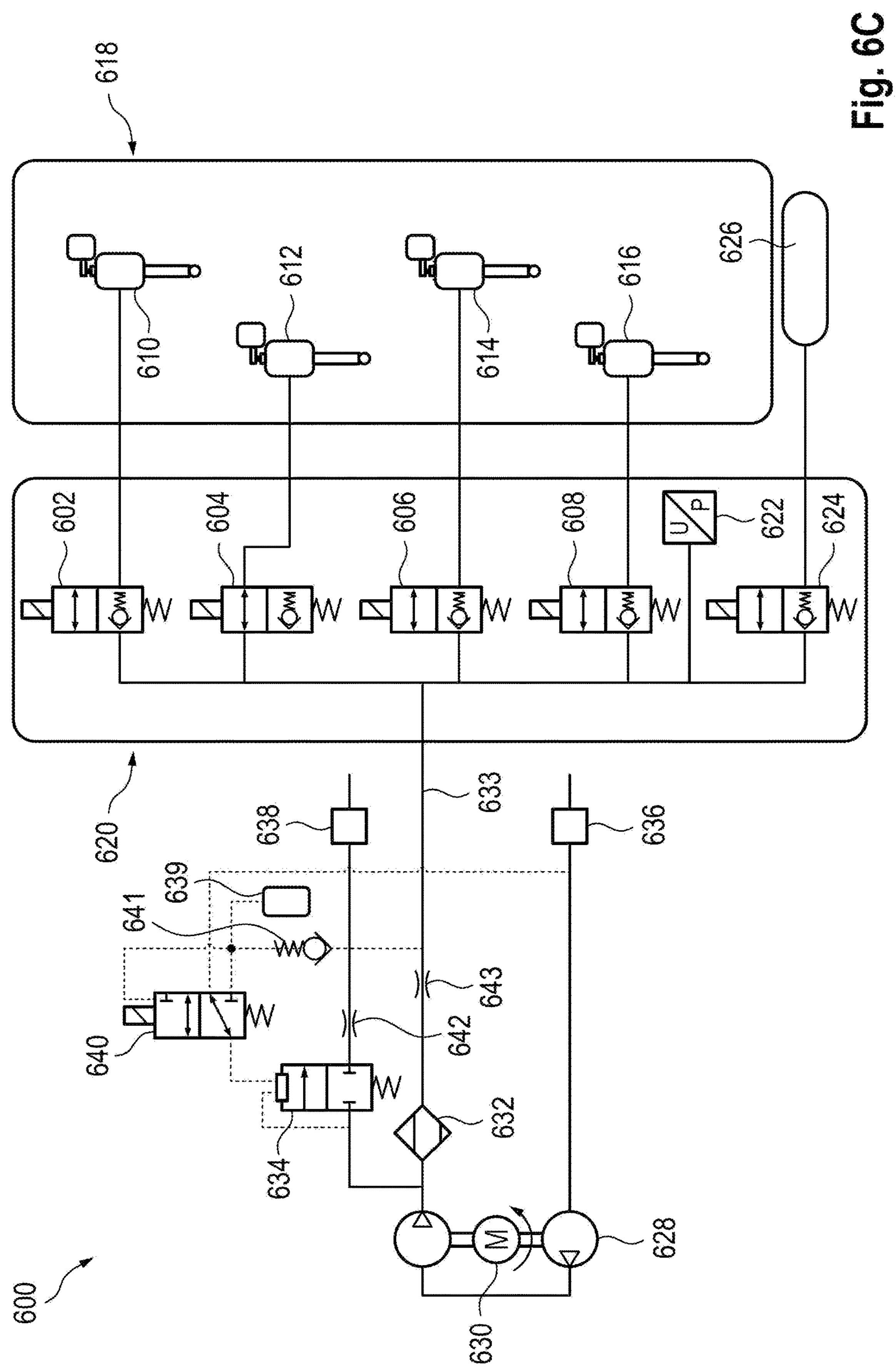
FIG. 6C shows the compressed air supply installation illustrated in FIGS. 6A and 6B, wherein the air spring valve of a first air spring is open in order to divert compressed air into the first air spring.

FIG. 6C shows the compressed air supply installation 600 described in relation to FIGS. 6A and 6B, wherein the air spring valve 604 of a first air spring 612 is open in order to divert compressed air into the first air spring 612. The first air spring 612 is located in a vehicle to the right on the front axle, as viewed in the direction of travel.

Figure 6D:
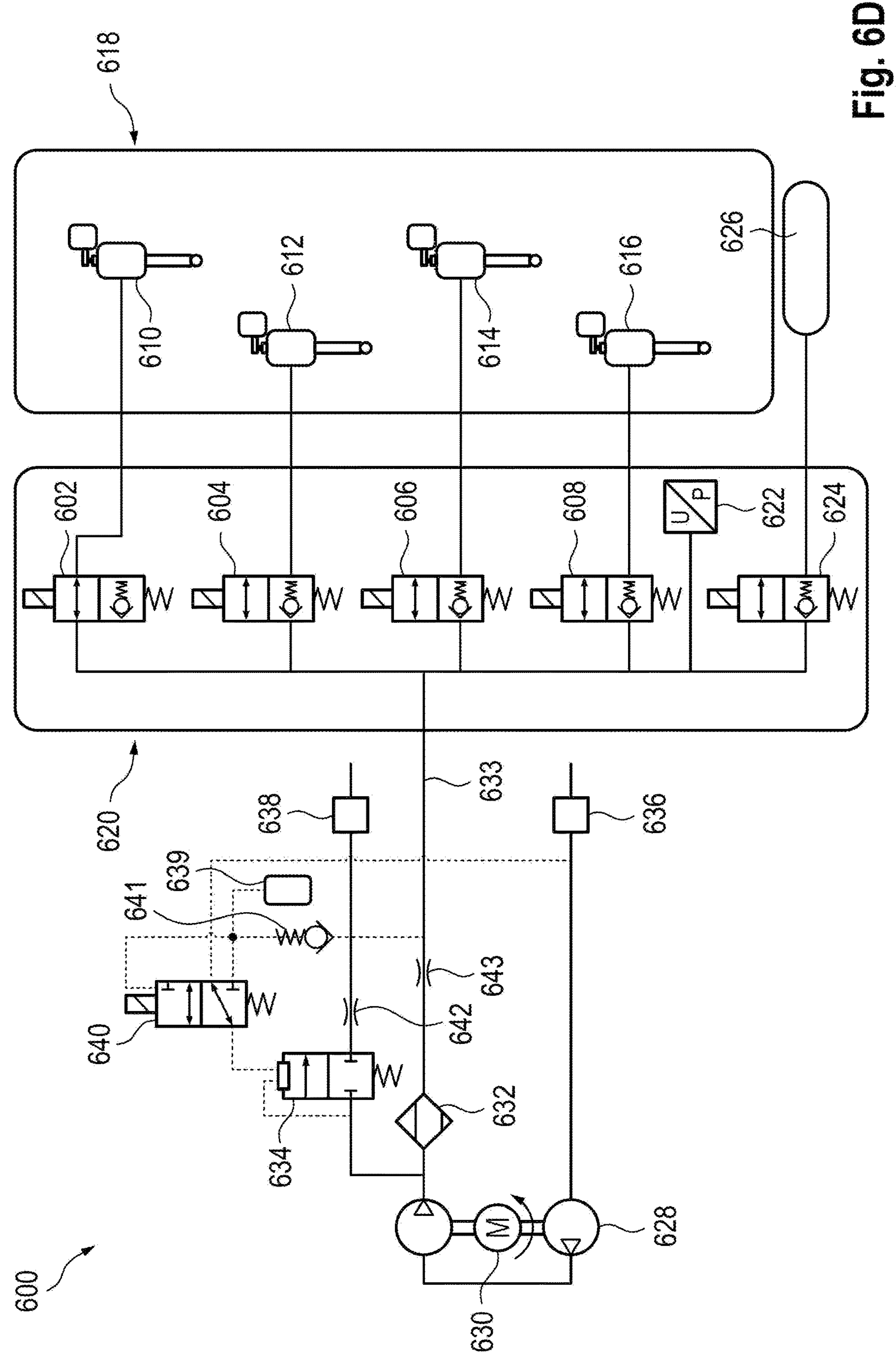
FIG. 6D shows the compressed air supply installation illustrated in FIGS. 6A to 6C, wherein the air spring valve of a second air spring is open in order to divert compressed air into the second air spring.

FIG. 6D shows the compressed air supply installation 600 described in relation to FIGS. 6A to 6C in an operating situation in which the air spring valve 602 of a second air spring 610 is open in order to divert compressed air into the second air spring 610. The second air spring 610 is located in a vehicle to the left on the front axle, as viewed in the direction of travel.

Figure 6E:
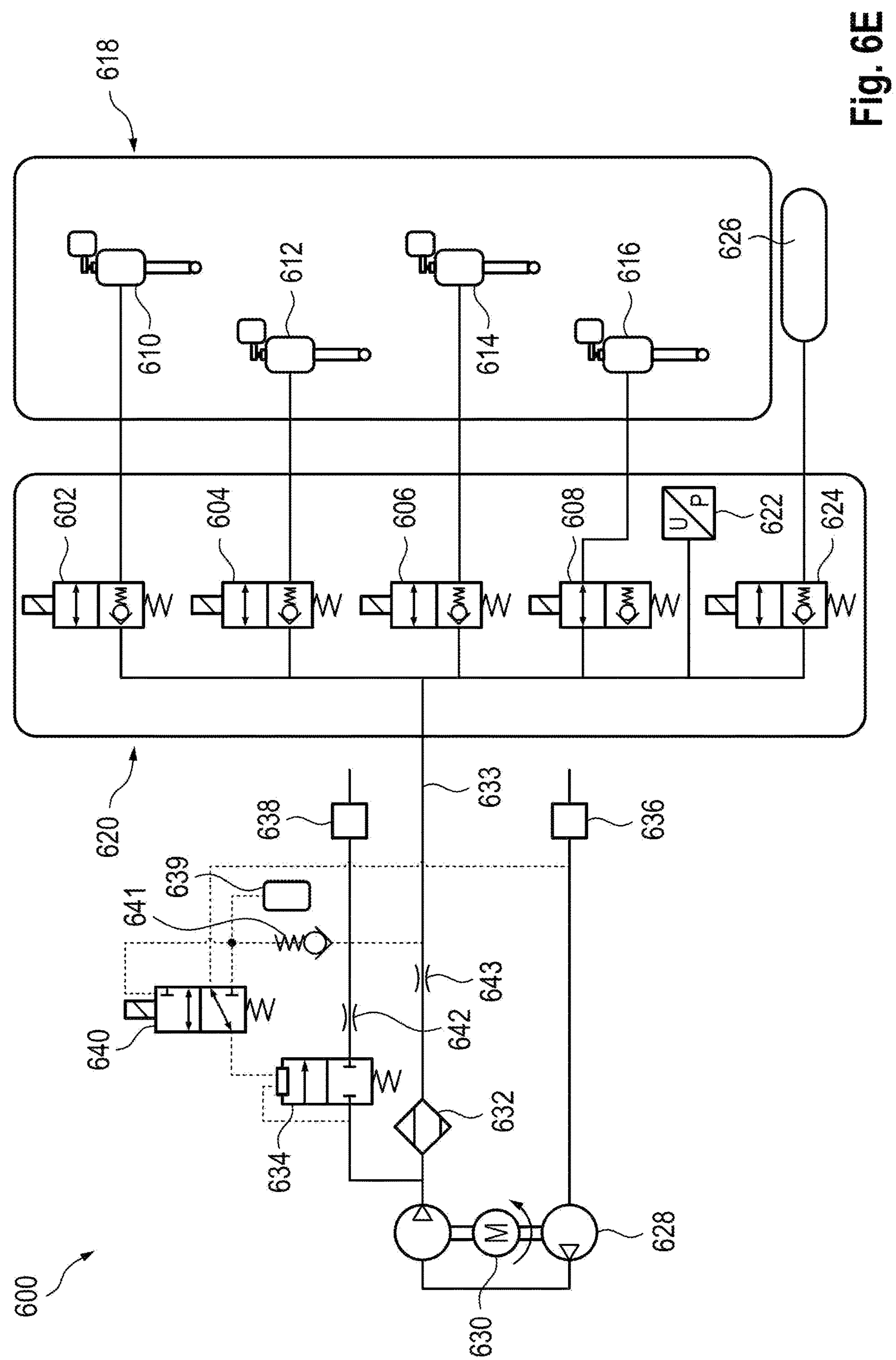
FIG. 6E shows the compressed air supply installation illustrated in FIGS. 6A to 6D, wherein the air spring valve of a third air spring is open in order to divert compressed air into the third air spring.

FIG. 6E shows the compressed air supply installation 600 described in relation to FIGS. 6A to 6D, in a further operating situation in which the air spring valve 608 of a third air spring 616 is open in order to divert compressed air into the third air spring 616. The third air spring 616 is located in a vehicle to the right on the rear axle, as viewed in the direction of travel.

Figure 6F:
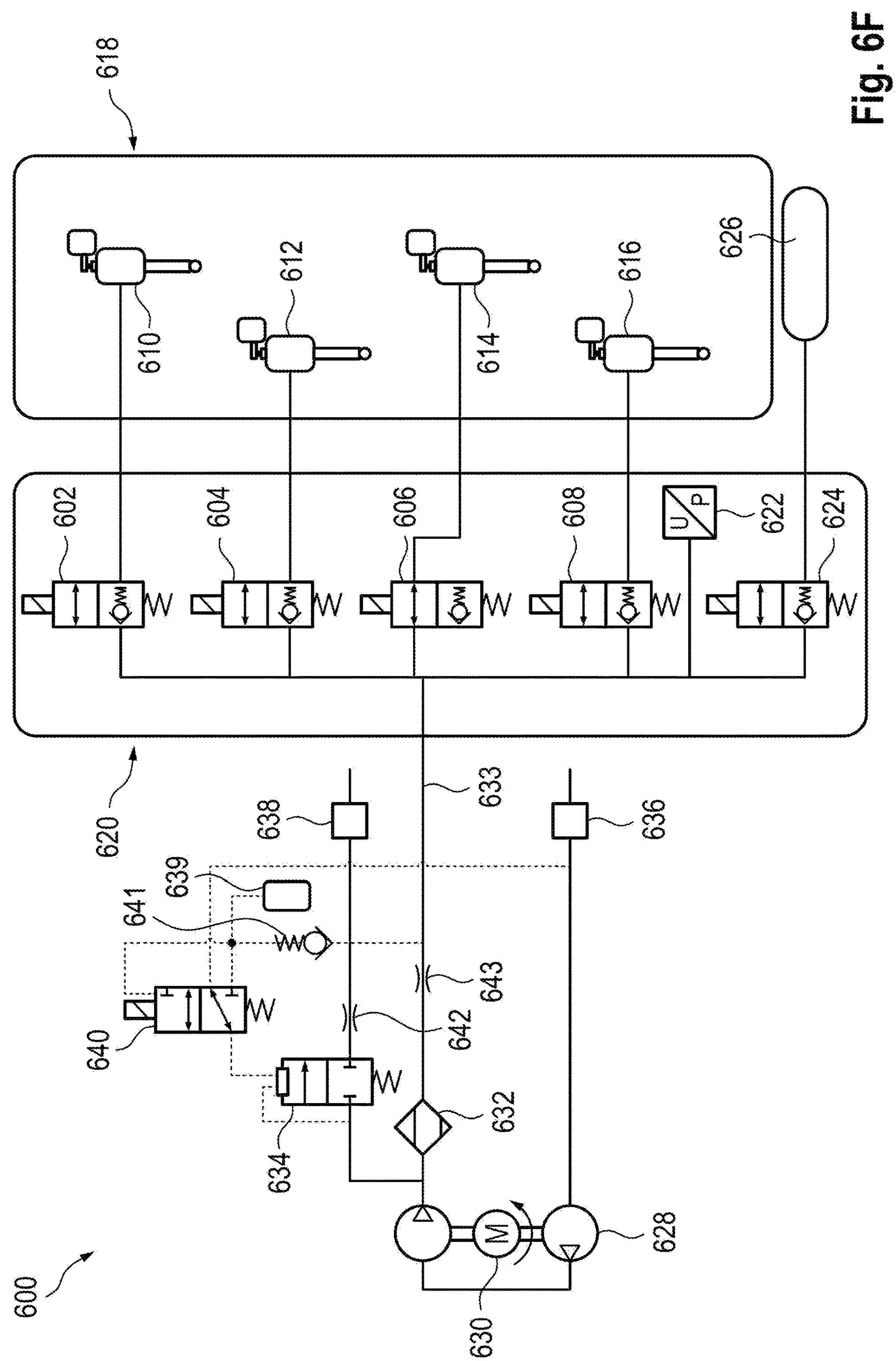
FIG. 6F shows the compressed air supply installation illustrated in FIGS. 6A to 6E, wherein the air spring valve of a fourth air spring is open in order to divert compressed air into the fourth air spring.

FIG. 6F shows the compressed air supply installation 600 described in relation to FIGS. 6A to 6E, in another further operating situation in which the air spring valve 606 of a fourth air spring 614 is open in order to divert compressed air into the fourth air spring 614. The fourth air spring 614 is located in a vehicle to the left on the rear axle, as viewed in the direction of travel.

As can be seen from FIGS. 6C to 6F, in the respective operating situation, only one of the air spring valves 602, 604, 606, 608 is open at any time and the remaining air spring valves 602, 604, 606, 608 are closed. Compressed air from the air dryer 632 and/or the air distributor module 620 is thus applied to the air springs 610, 612, 614, 616 individually in a chronologically consecutive manner.

In this process, each of the air springs 610, 612, 614, 616 is filled in each case with compressed air in a specified compressed air quantity and/or for a predefined period of time.

The excess compressed air from the air dryer 632 and/or the air distributor module 620 is thus distributed in portions to the air springs 610, 612, 614, 616. Compressed air is applied to the air springs 610, 612, 614, 616 in a chronologically consecutive manner in particular until the excess compressed air from the air dryer 632 and/or the air distributor module 620 is distributed to the air springs. The compressed air quantity of the excess compressed air is determined in particular in accordance with the amount by which the pressure in the air dryer 632 and/or the air distributor module 620 has to be reduced so that, at the exhaust 638, a pressure prevails which does not lead to a noise level above a specified threshold when the compressed air supply installation 600 is vented into the surrounding atmosphere.

Figure 6G:
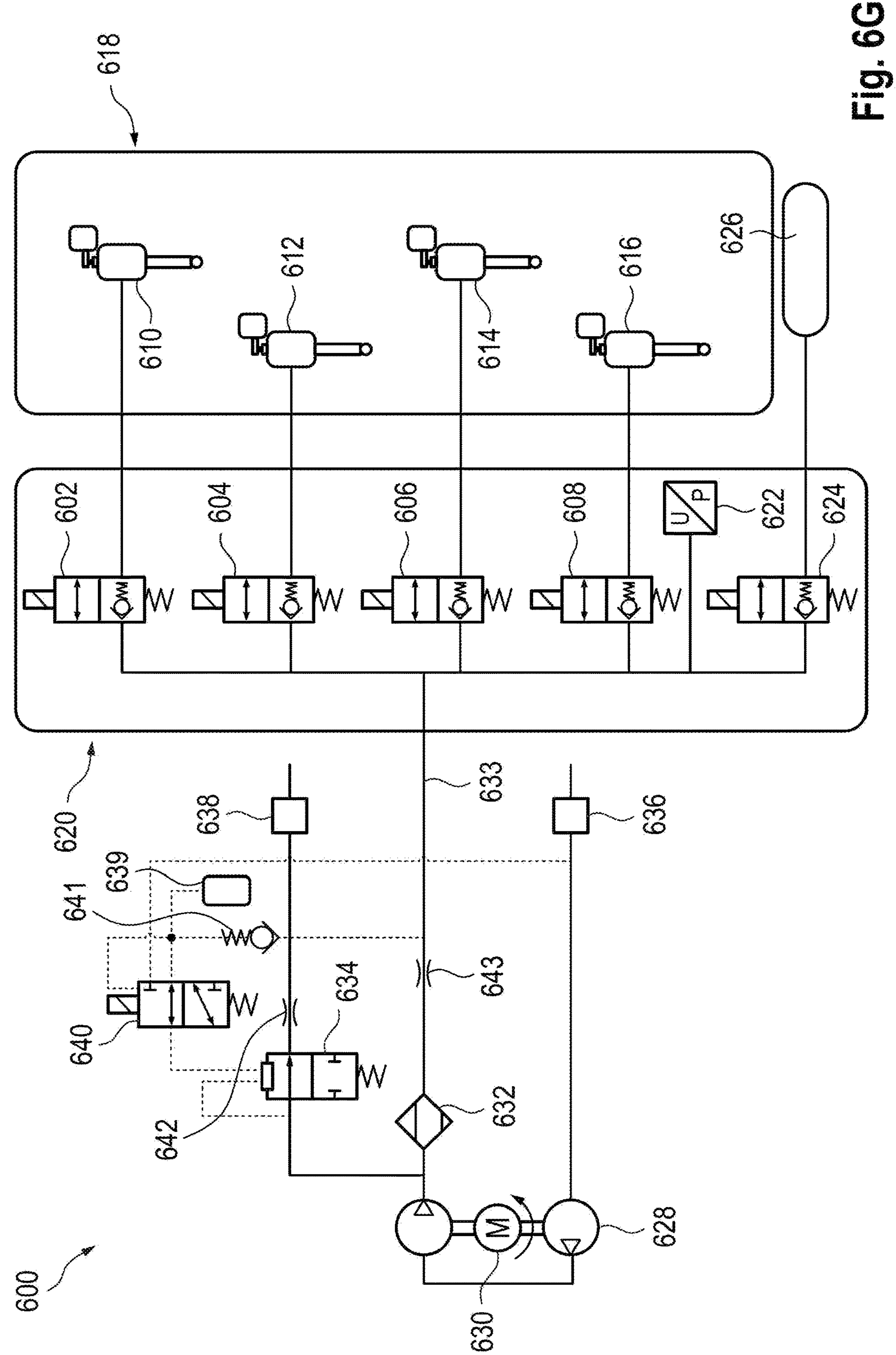
FIG. 6G shows the compressed air supply installation illustrated in FIGS. 6A to 6F, wherein all air spring valves are closed and a relay valve and a valve for filling the auxiliary storage means are open.

FIG. 6G shows the compressed air supply installation 600 described in relation to FIGS. 6A to 6F in an operating situation in which all air spring valves 602, 604, 606, 608 are closed and the relay valve 634 and the valve 640 for filling the auxiliary storage means 639 are open. Since the excess compressed air was distributed to the air springs 610, 612, 614, 616 and the auxiliary storage means 639 before venting, the pressure at the exhaust 638 is comparatively low, so that venting the compressed air supply installation 600 does not result in a noise level above a specified threshold.

Figure 7:
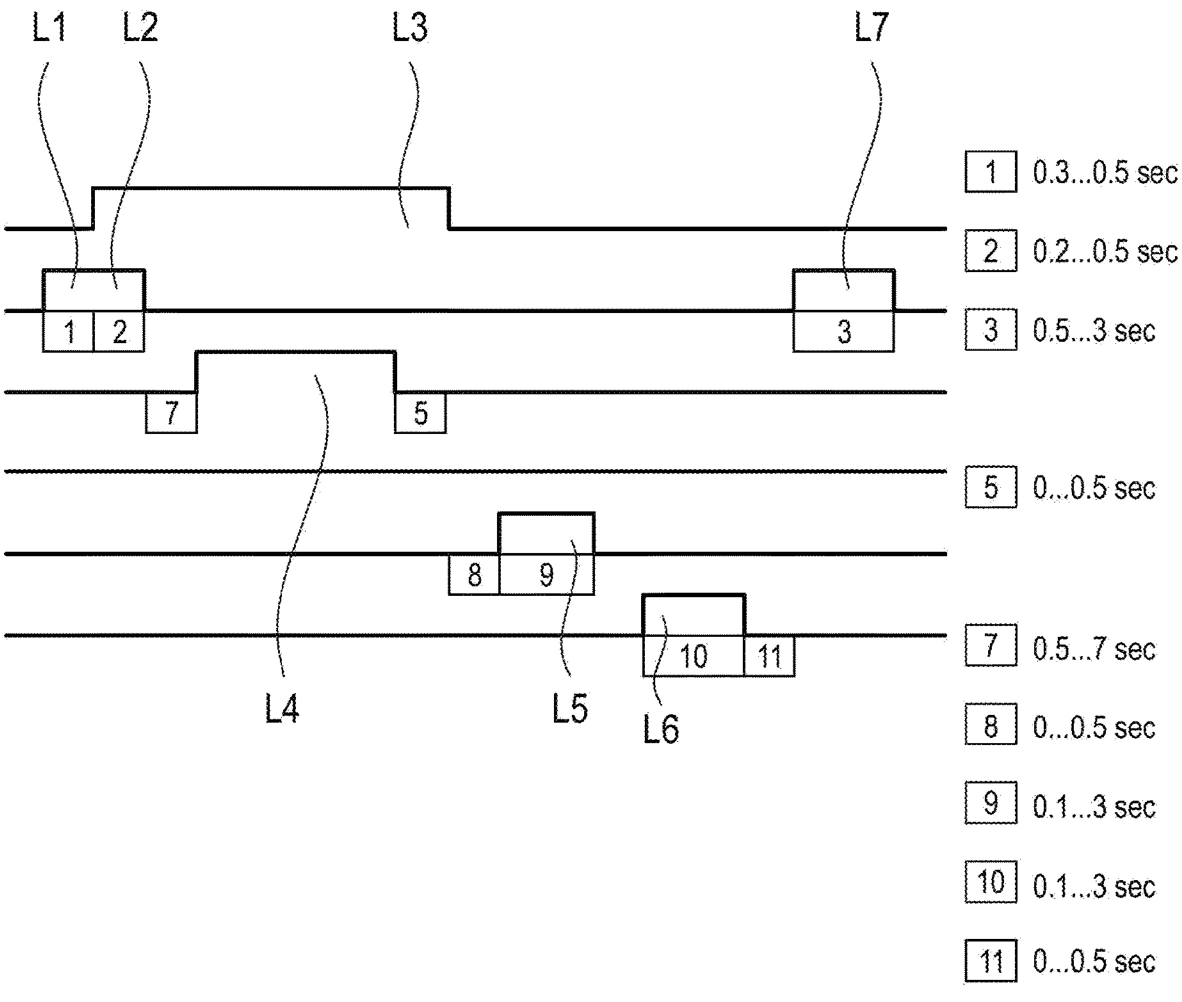
FIG. 7 shows a logic diagram which represents a sequence when filling the compressed air reservoir with compressed air from the surrounding atmosphere.

FIG. 7 shows a logic diagram which indicates the chronological order of the steps for filling a compressed air reservoir via a compressing means. Filling the compressed air reservoir includes partially discharging compressed air from an air dryer into air springs of an air spring installation. The intake valve is initially opened for a period of time of 0.3 seconds to 0.5 seconds (step L1), so that air from the surrounding atmosphere can flow into the compressed air supply installation. The intake valve then remains open for a further 0.2 seconds to 0.5 seconds (step L2). The compressing means is activated (step L3) during this period of time in order to draw in air from the surrounding atmosphere. The steps L2 and L3 begin simultaneously. However, the compressing means remains activated even when the intake valve is closed again.

After the intake valve has been closed for a period of time of 0.5 seconds to 7 seconds, a booster valve is activated (step L4) to increase the quantity of air in the compressed air supply installation. While the booster valve is activated, the compressing means likewise remains activated. Furthermore, the compressing means also remains activated for a further approximately 0 seconds to 0.5 seconds after the booster valve has been closed. The compressing means is subsequently set to idle mode. When the compressing means is in idle mode, after a period of time of 0 seconds to 0.5 seconds, the air spring valve of the air spring located to the left on the front axle, as viewed in the direction of travel of the vehicle, is opened (step L5). The air spring valve of this air spring is opened for a period of time of 0.1 seconds to 3 seconds. The period of time for which compressed air is applied to the air spring may in particular be a predefined period of time. Chronologically after the air spring valve of this air spring has been closed, the air spring valve of the air spring located to the right on the front axle, as viewed in the direction of travel of the vehicle, is opened (step L6). Compressed air is applied for a period of time of 0.1 seconds to 3 seconds to the air spring arranged to the right on the front axle.

The period of time for which compressed air is applied in each case to the two air springs of the front axle may differ.

According to the logic diagram shown here, compressed air is only applied to the air springs of the front axle of the vehicle. Alternatively or additionally, compressed air may also be applied to the two air springs of the rear axle. As a further alternative, compressed air could be applied to the air springs of the front axle and/or the air springs of the rear axle simultaneously, that is, in groups of two air springs.

After the air spring valve of the air spring arranged to the right on the front axle has been closed again, after a period of time of 0 seconds to 0.5 seconds, the exhaust valve of the compressed air supply installation is opened (step L7).

By discharging compressed air into the two air springs of the front axle of the vehicle, the level of the pressure at the exhaust valve can be reduced accordingly. It is then possible to vent the compressed air supply installation at a comparatively lower pressure, so that the noise level generated when venting is accordingly also comparatively lower.

Figure 8:
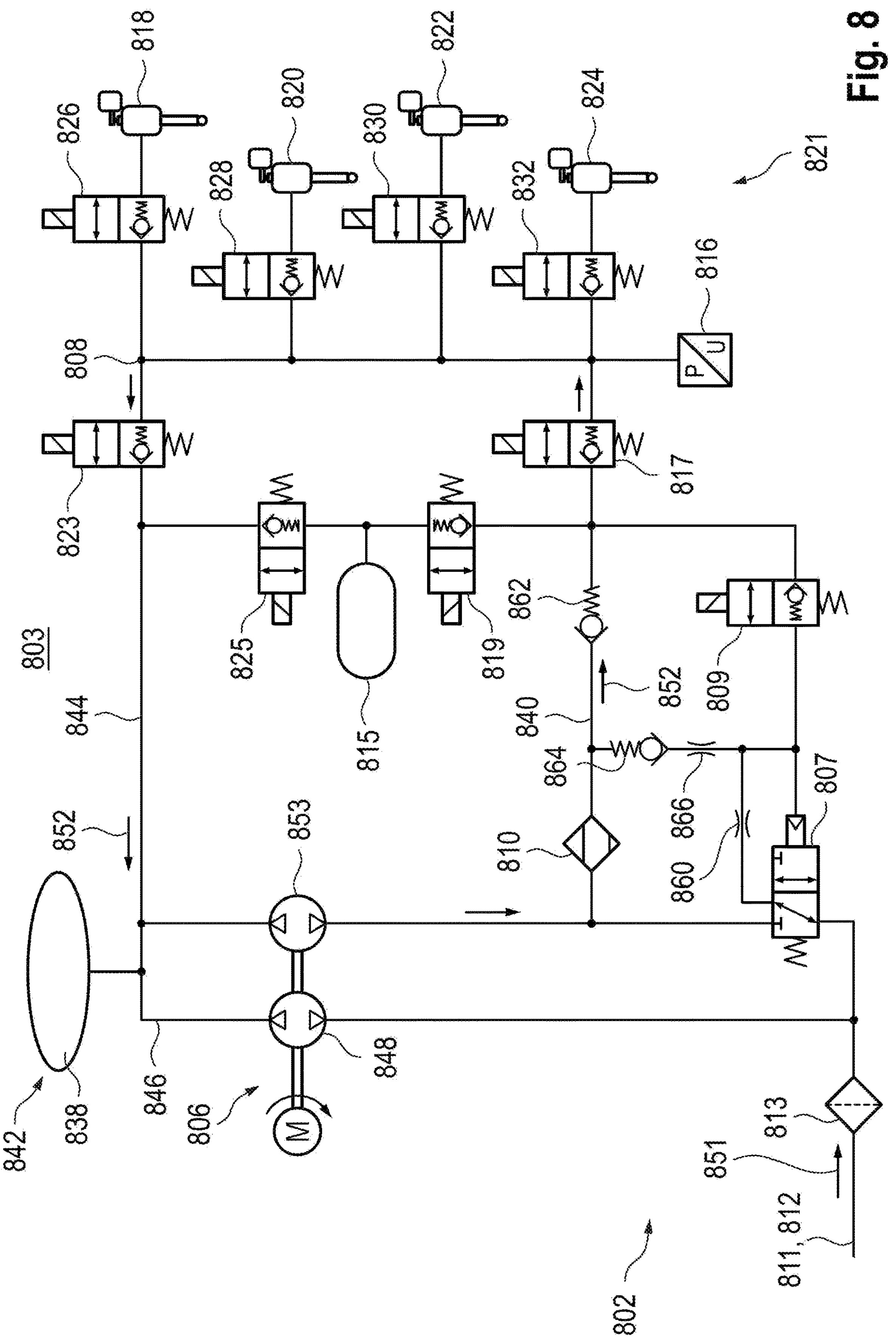
FIG. 8 schematically shows a compressed air supply installation, which is pneumatically connected to an air spring installation, is realized as a closed system and has an auxiliary storage means.

FIG. 8 schematically shows a compressed air supply installation 802, which is pneumatically connected to an air spring installation 821, is realized as a closed system and has an auxiliary storage means 838.

The compressed air supply installation forms part of a vehicle 803.

The compressed air supply installation 802 includes an intake 811 and an exhaust 812 with a filter 813 for filtering drawn-in air 850. To draw in air 850, the compressed air supply installation 802 includes a compressing means 806. The air 850 is compressed by the compressing means 806 and is transferred as compressed air 851 to the air dryer 810 of the compressed air supply installation 802.

The dry compressed air 852 is transferred from the air dryer 810 to the air distributor module 808 via a pneumatic main line 840. A check valve 862 is provided in the pneumatic main line 840. The pneumatic main line 840 is also pneumatically connected to a relay valve 807 via a check valve 864 and throttles 860, 866. The air distributor module 808 includes four air spring valves 826, 828, 830, 832. In addition, the air distributor module 808 includes a pressure sensor 816 for measuring a level of the pressure in the air distributor module 808. The air distributor module 808 is connected via the air spring valves 826, 828, 830, 832 to the air springs 818, 820, 822, 824 respectively. By opening the air spring valves 826, 828, 830, 832, compressed air from the compressed air supply installation 802 can thus be applied to the air springs 818, 820, 822, 824 of the air spring installation 821, for example in order to raise the vehicle 803 relative to the ground.

In order to divert compressed air 852 into the air distributor module 808, a separating valve 817, which is positioned upstream and is configured as a 2/2-way solenoid valve, is opened.

Additionally or alternatively, the compressed air 852 could also be discharged into a compressed air reservoir 815 of the compressed air supply installation 802 by opening a reservoir valve 819.

Compressed air 852, which is to be conveyed from the air distributor module 808 back in the direction of the exhaust 812, flows through a return flow valve 823, which is also configured as a 2/2-way solenoid valve. Compressed air 852 flowing through the return flow valve 823 can be discharged into the compressed air reservoir 815 via a booster valve 825. Compressed air 852 flowing through the return flow valve 823 enters a connecting volume 842, which has a pneumatic return flow line 844 which connects the air distributor module 808 and in particular the gallery thereof to the compressing means 806 via the return flow valve 823. The connecting volume 842 further includes a compressing means line 846, which pneumatically connects a first compression stage 848 of the compressing means 806 to a second compression stage 853 of the compressing means 806. During operation, the connecting volume 842 is in particular at the same pressure as the first compressing means stage 848, this pressure being lower than the pressure in the rest of the compressed air supply installation 802, which is namely at the same pressure as the second compressing means stage 853. The pressure in the air dryer 810 can therefore be reduced effectively by discharging compressed air at the pressure of the second compressing means stage 853 into the connecting volume 842. The connecting volume 842 can be used to reduce the pressure in the air dryer in addition to or as an alternative to discharging compressed air into the air springs and/or into the compressing means itself, for example into a piston volume of the compressing means.

The connecting volume 842 additionally has an auxiliary storage means 838 into which compressed air can be discharged. By discharging the compressed air 852 into the auxiliary storage means 838, the level of the pressure at the exhaust 812 can be additionally reduced. To vent the compressed air supply installation 802, the latter also includes an exhaust valve 809 and a relay valve 807, both of which are configured as a 2/2-way solenoid valve. The compressed air supply installation 802 can then be vented at a comparatively lower pressure.

FIG. 9 schematically shows a compressed air supply installation 902, which is pneumatically connected to an air spring installation 900, is realized as a closed system and has a connecting volume 941 including a return flow line 942, an auxiliary storage means 904 and a compressing means line 944 between a first compressing means stage 948 and a second compressing means stage 955 of a two-stage compressing means 906. The return flow line 942 extends from a return flow valve 938 to the compressing means 906.

The compressed air supply installation 902 includes an intake 911 and an exhaust 912. The compressed air supply installation 902 also includes a compressing means 906 with a brushless DC motor 907, the auxiliary storage means 904, and an air dryer 910. Via a throttle 914 with a diameter of 1.2 mm, the air dryer 910 is connected to an air distributor module 929 via a pneumatic main line 954 and a separating valve 984. The pneumatic main line 954 also has a throttle 886. A check valve 988 and a further throttle 990 are also integrated into the pneumatic main line 954. The compressed air supply installation 902 includes an exhaust valve 915, which is configured as a 2/2-way solenoid valve. The compressed air supply installation 902 further includes a reservoir valve 934, via which a compressed air reservoir 917 can be filled with compressed air. The compressed air reservoir 917 can also be filled with compressed air via a boost valve 936. The compressed air supply installation 902 further includes a separating valve 940, via which the dry compressed air can be discharged into an air distributor module 929 of the compressed air supply installation 902. In order to evacuate the air distributor module 929, the exhaust valve 915 of the compressed air supply installation 902 is opened.

The air distributor module 929 includes four air spring valves 926, 928, 930, 932 via which compressed air from the compressed air supply installation 902 can be discharged into the air springs 918, 920, 922, 924 of the air spring installation 900 of a vehicle. The air spring module 920 also includes a pressure sensor 916, which can detect a level of a pressure in the air distributor module 929.

In order to further reduce the pressure at the exhaust 911, compressed air can be discharged into the air springs 918, 920, 922, 924 and/or into the connecting volume 940. The connecting volume 940 also includes a piston volume of the compressing means 906, which is correspondingly configured as a piston compressing means.

To vent the compressed air supply installation 902 and in particular the air dryer 910 and/or the air distributor module 929, the air spring valves 926, 928, 930, 932 are closed and the compressing means 906 is set to idle mode. The exhaust valve 915, which is configured as a 2/2-way solenoid valve, is subsequently opened.

Figure 9A:
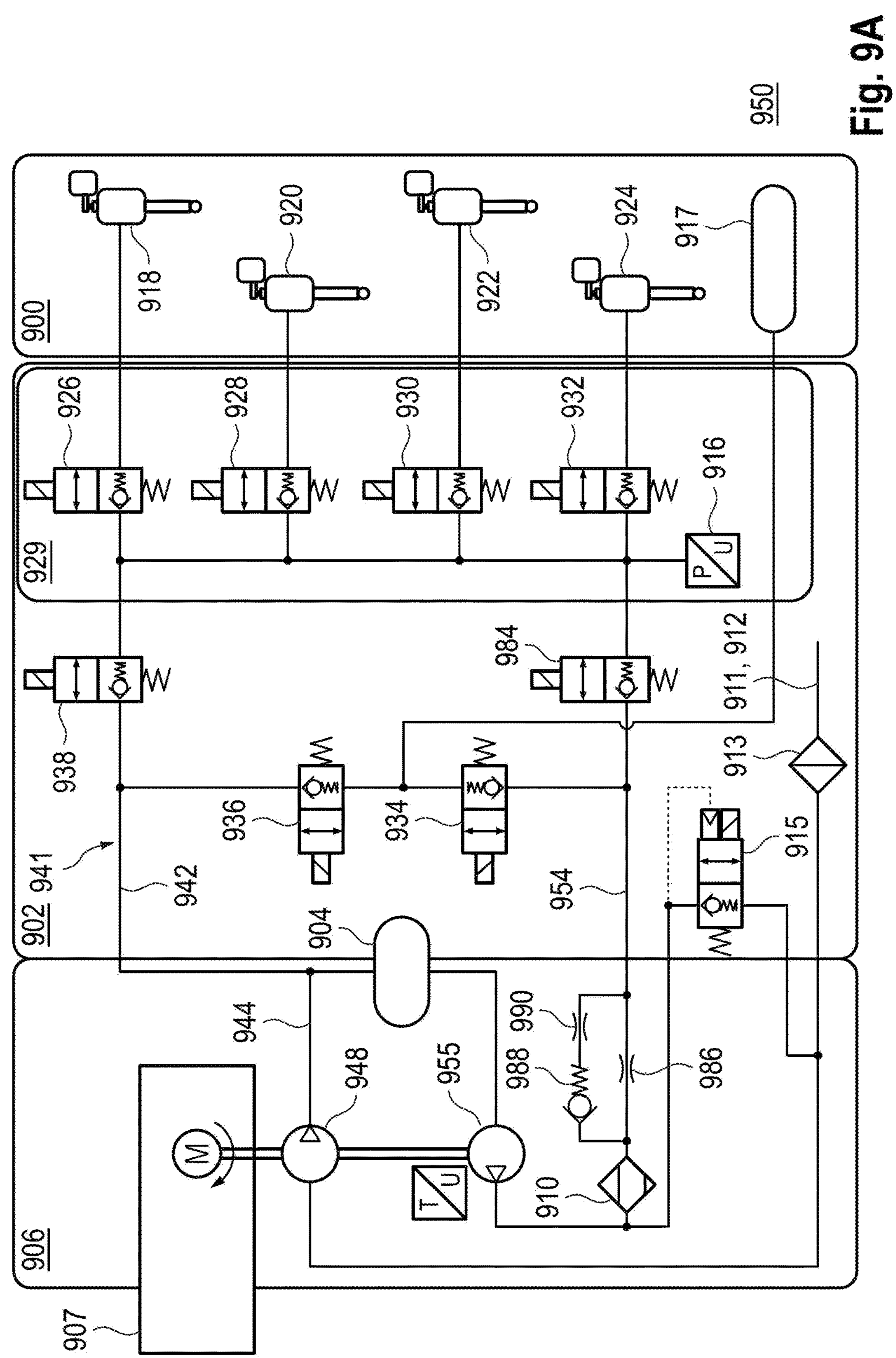
FIG. 9A schematically shows a compressed air supply installation, which is pneumatically connected to an air spring installation, is realized as a closed system and in which the compressing means has an auxiliary storage means.
Figure 9B:
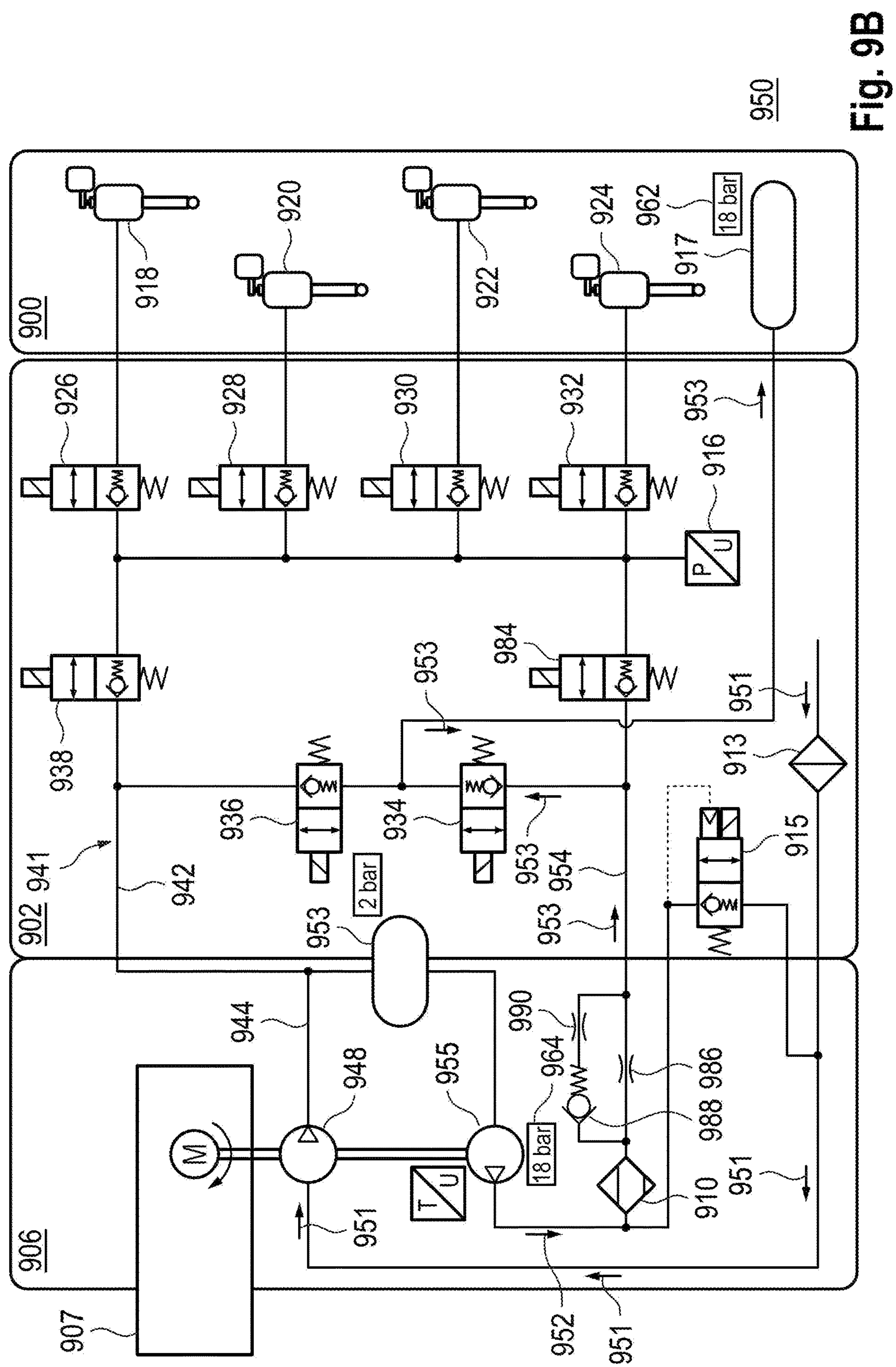
FIG. 9B schematically shows the compressed air supply installation illustrated in FIG. 9A and depicts the diversion of compressed air from the surrounding atmosphere into the compressed air reservoir.

FIG. 9B schematically shows the compressed air supply installation 902 described in relation to FIG. 9A, wherein FIG. 9B uses arrows to depict the direction of the flow of compressed air.

During operation of the compressed air supply installation 902, air 951 is initially drawn in from the surrounding atmosphere 950 by the compressing means 906 and compressed by the compressing means 906. A portion of the air which has been compressed is discharged into the connecting volume 941, so that the pressure in the connecting volume 941 is two bar. The remaining air which has been compressed is transferred as compressed air 952 to the air dryer 910. The air dried by the air dryer is discharged into the compressed air reservoir 917 as dry compressed air 953. The reservoir valve 934 is opened for this purpose.

Since the pressure in the air dryer 910 is 18 bar, the compressed air supply installation 902 cannot be vented without generating a noise level above a critical threshold.

Figure 9C:
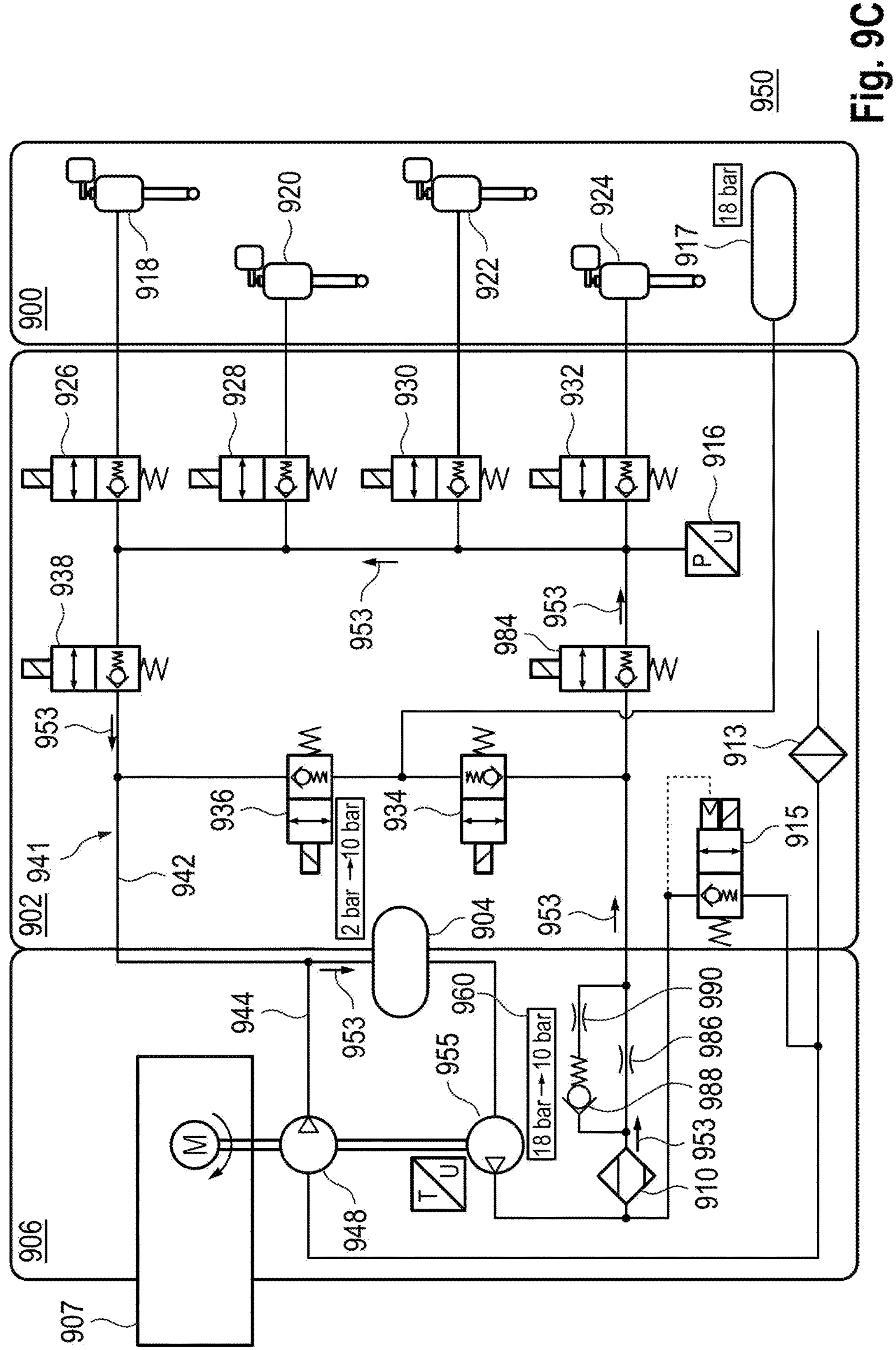
FIG. 9C schematically shows the compressed air supply installation illustrated in FIGS. 9A and 9B and depicts the diversion of compressed air into the auxiliary storage means; and, FIG. 9D schematically shows the compressed air supply installation illustrated in FIGS. 9A to 9C and depicts the air dryer being vented.

In FIG. 9C, the compressed air supply installation 902 described in relation to FIGS. 9A and 9B is schematically shown, wherein FIG. 9C uses arrows to depict the direction of the flow of compressed air when compressed air is stored temporarily in the connecting volume 941 in order to reduce the pressure at the exhaust 912.

Since in particular the pressure in the air dryer 910 is critical when venting the compressed air supply installation 902, the pressure in the air dryer 910 is preferably reduced. In contrast, the level of the pressure in the compressed air reservoir 917 is generally less critical when venting.

Accordingly, to reduce the pressure in the air dryer 910, the reservoir valve 934 is closed and the separating valve 940 is opened instead. Dry compressed air 953 then flows into the air distributor module 929. Since the air spring valves 926, 928, 930, 932 are closed, the air springs 918, 920, 922, 924 are not filled with compressed air. Instead, the return flow valve 938 is opened so that the compressed air flows through the air distributor module and is discharged into the connecting volume 941.

Compressed air is then applied to the connecting volume 941, so that in the example shown here, the level of the pressure in the connecting volume 941 rises from 2 bar to 10 bar. As a result, the pressure in the air dryer 910 falls accordingly from 18 bar to 10 bar and therefore falls below a critical threshold, which may be, for example, 11 bar or 12 bar.

Figure 9D:
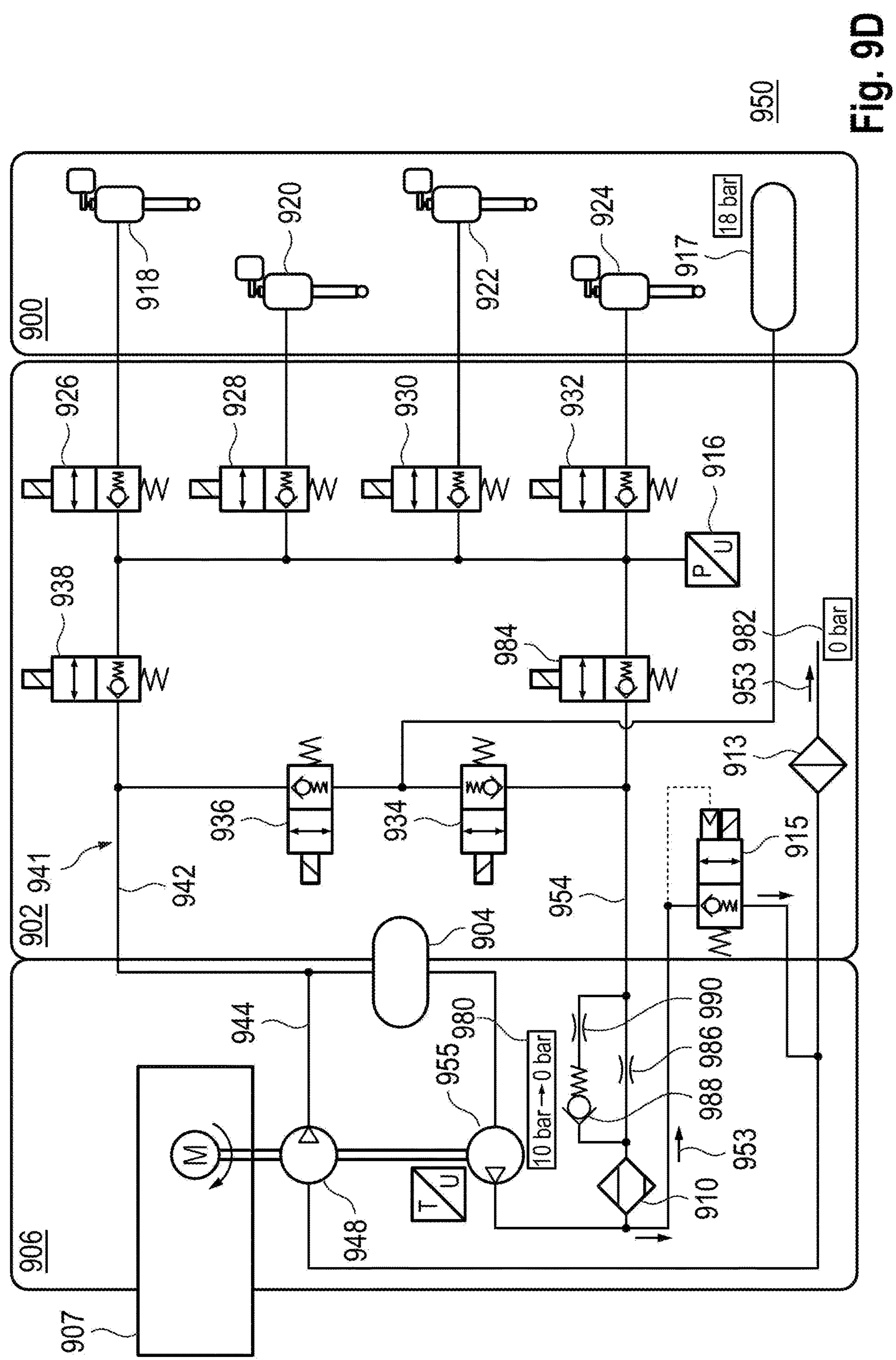

FIG. 9D schematically shows the compressed air supply installation 902 described in relation to FIGS. 9A to 9C, wherein FIG. 9D uses arrows to depict the direction of the flow of the compressed air when the compressed air supply installation 902, and in particular the air dryer 910, is vented. After the level of the pressure in the air dryer 910 has been reduced to 10 bar by applying compressed air to the connecting volume 941, the compressed air supply installation 902 can then be vented at a comparatively lower pressure.

For venting purposes, the exhaust valve 915 is opened to allow compressed air 953 to flow through the former. Venting the compressed air supply installation 902 causes the pressure in the air dryer 910 to fall accordingly from 10 bar to 0 bar, that is, to the pressure of the surrounding atmosphere 950.

It is understood that the foregoing description is that of the preferred embodiments of the invention and that various changes and modifications may be made thereto without departing from the spirit and scope of the invention as defined in the appended claims.

LIST OF REFERENCE SIGNS [PART OF THE DESCRIPTION]

1, 1' compressor port
2, 2' compressed air supply port
3,3' exhaust
50, 50' surrounding atmosphere
51, 51' drawn-in air
52, 52' compressed air
53, 53' compressed air
54, 54' compressed air
55, 55' data connection
56, 56' control lines
100, 100' control device

101' vehicle
102, 102' compressed air supply installation
103, 103' pneumatic system
106, 106' compressing means
107, 107' intermediate storage means
108, 108' air distributor module
109, 109' overpressure volume
110, 110' air dryer
111, 111' intake valve
112, 112' exhaust valve
113, 113' compensation volume
116, 116' pressure sensor
118, 120, 122, 124, 118', 120', 122', 124' air springs
121, 121' air spring installation
126, 128, 130, 132, 126', 128', 130', 132' air spring valves
129 gallery
131 pneumatic main line
150 pneumatic system
152 compressed air supply installation
154 air spring installation
155 control device
156 compressed air valve
158 compressing means
160 surroundings
162 air
164 compressed air
166 air dryer
168 pneumatic main line
170 compressing means port
172 compressed air supply port
174 dried compressed air
176 air distributor module
178 gallery
180 pressure sensor
182, 184, 186, 188 air springs
190, 192, 194, 196 air spring valves
198 return flow valve
200 return flow line
202 auxiliary storage means
204 overpressure volume
206 compensation volume
208 intermediate storage means
300 graph
302 compressed air quantity emitted into the surrounding atmosphere
304 pressure at exhaust
306, 308, 310 curves
312 arrow
314 first pressure sub-range
316 second pressure sub-range
500 control device
502 compressed air supply installation
503 vehicle
506 compressing means
507 pneumatic main line
508 air distributor module
510 air dryer
511 intake
512 exhaust
515 compressed air reservoir
516 pressure sensor
518, 520, 522, 524 air springs
521 air spring installation
534 front axle
536 rear axle
550 surrounding atmosphere
551 data connection
552 compressed air
552' smaller compressed air quantity
555 control line
580 pressure of the air spring which, in comparison with the pressures in the remaining air springs, has the smallest pressure difference to the pressure in the air distributor module
582, 584, 586 remaining air springs
600 compressed air supply installation
602, 604, 606, 608 air spring valves
610, 612, 614, 616 air springs
618 air spring installation
620 air distributor module
622 pressure sensor
624 reservoir valve
626 compressed air reservoir
627 gallery
628 compressing means
630 electric motor
632 air dryer
633 pneumatic main line
634 relay valve
636 intake
638 exhaust
639 auxiliary storage means
640 valve
641 check valve
642, 643 throttle
802 compressed air supply installation
803 vehicle
806 compressing means
808 air distributor module
810 air dryer
811 intake
812 exhaust
813 filter
815 compressed air reservoir
816 pressure sensor
817 separating valve
818, 820, 822, 824 air springs
819 reservoir valve
821 air spring installation
823 return flow valve
825 booster valve
826, 828, 830, 832 air spring valves
838 auxiliary storage means
840 pneumatic main line
842 connecting volume
844 return flow line
846 compressing means line
848 first compression stage
850 drawn-in air
851 compressed air
852 compressed air
853 second compression stage
860 throttle
862 check valve
864 check valve
866 throttle
900 air spring installation
902 compressed air supply installation
904 auxiliary storage means
906 compressing means
907 DC motor
910 air dryer
911 intake
912 exhaust

914 throttle
915 exhaust valve
916 pressure sensor
917 compressed air reservoir
918, 920, 922, 924 air springs
929 air distributor module
926, 928, 930, 932 air spring valves
934 reservoir valve
936 boost valve
938 return flow valve
940 separating valve
941 connecting volume
942 return flow line
944 compressing means line
948 first compressing means stage
950 surrounding atmosphere
951 air
952 compressed air
953 dry compressed air
954 pneumatic main line
955 second compressing means stage
960 predefined pressure drop
962 pressure in the at least one air spring
964 level of the pressure in the air distributor module
980 pressure at the exhaust
982 pressure in the surrounding atmosphere
984 separating valve
886 throttle
988 check valve
990 throttle
S1 setting the compressing means to idle mode
S2 closing the exhaust valve
S3 opening the air spring valves
S4 establishing an equilibrium pressure
S5 closing the air spring valves
S6 opening the exhaust valve
T1 setting the compressing means to idle mode
T2 closing the exhaust valve
T3 specifying the compressed air quantity and/or a period of time
T4 applying compressed air to first air spring
T5 applying compressed air to second air spring
T6 applying compressed air to third air spring
T7 applying compressed air to fourth air spring
T8 filling the air springs again
T9 activating the compressing means
T10 opening the exhaust valve
T11 filling two air springs with compressed air
T12 filling the other two air springs with compressed air
T13 filling the air springs again
L1 opening the intake valve
L2 keeping the intake valve open
L3 activating the compressing means
L4 activating the booster valve
L5 filling an air spring for a predefined period of time
L6 filling an air spring for a predefined period of time
L7 opening the exhaust valve

The invention claimed is:

1. A method for operating a pneumatic system having a compressed air supply and an air spring arrangement, pneumatically connected to the compressed air supply, the pneumatic system being for a vehicle, wherein:

the compressed air supply has a pneumatic main line and an air dryer in the pneumatic main line, and the pneumatic main line has a compressor port to a compressor, and a compressed air supply port to an air distributor module, wherein:

the air spring arrangement has a plurality of air springs, pneumatically connected via a gallery of the air spring arrangement, and wherein:

the pneumatic system has a controller for controlling the compressed air supply and the air spring arrangement, and wherein, in the method, the air dryer and/or the air distributor module represents an overpressure volume, wherein:

the overpressure volume initially has a pressure greater than a pressure in a remaining portion of the compressed air supply with the remaining portion being defined by a compensation volume;

the pneumatic system further having at least one first air spring and an intermediate store or the intermediate store; wherein the method comprises:

discharging compressed air from the overpressure volume into the compensation volume, accompanied by a reduction in the pressure in the overpressure volume with the accompanying reduction in the pressure in the air dryer and/or reduction in the pressure in the air distributor module;

wherein compressed air is discharged into the at least one first air spring of the air spring arrangement and into the intermediate store, wherein the intermediate store comprises the compressor and/or a connecting volume wherein the connecting volume has a pneumatic return flow line connecting the gallery to the compressor via a return flow valve.

2. A method for operating a pneumatic system having a compressed air supply and an air spring arrangement, pneumatically connected to the compressed air supply, the pneumatic system being for a vehicle, wherein:

the compressed air supply has a pneumatic main line and an air dryer in the pneumatic main line, and the pneumatic main line has a compressor port to a compressor, and a compressed air supply port to an air distributor module, wherein:

the air spring arrangement has a plurality of air springs, pneumatically connected via a gallery of the air spring arrangement, and wherein:

the pneumatic system has a controller for controlling the compressed air supply and the air spring arrangement, and wherein, in the method, the air dryer and/or the air distributor module represents an overpressure volume, wherein:

the overpressure volume initially has a pressure greater than a pressure in a remaining portion of the compressed air supply with the remaining portion being defined by a compensation volume;

the pneumatic system further having at least one first air spring and an intermediate store or the intermediate store; wherein the method comprises:

discharging compressed air from the overpressure volume into the compensation volume, accompanied by a reduction in the pressure in the overpressure volume with an accompanying reduction in the pressure in the air dryer and/or reduction in the pressure in the air distributor module;

wherein compressed air is discharged into one of the following:

a) into the at least one first air spring of the air spring arrangement and into the intermediate store; or, b) into the intermediate store; and, wherein the compensation volume comprises the at least one first air spring and the intermediate store comprises a second air spring of the plurality of air springs, and compressed air is discharged in a chronologically consecutive manner individually into the first air spring and subsequently into the second air spring.

3. The method of claim 1, wherein compressed air from the overpressure volume is discharged into the at least one first air spring and the intermediate store in a chronologically consecutive manner, beginning with the intermediate store.

4. The method of claim 1, wherein compressed air from the overpressure volume is initially applied to the plurality of air springs of the air spring arrangement, and only after the plurality of air springs have been filled with compressed air is residual compressed air from the overpressure volume discharged into the intermediate store.

5. The method of claim 1, wherein after the pressure in the overpressure volume has been reduced, the remaining portion of the compressed air from the overpressure volume is at least partially emitted through an exhaust to a surrounding atmosphere.

6. The method of claim 1, wherein a connecting volume comprises an auxiliary store pneumatically connected to a return flow line.

7. The method of claim 1, wherein compressed air from the overpressure volume is applied to the compensation volume when, before the pressure in the overpressure volume is reduced, a pressure sensor measures a pressure in the air distributor module of one of the following: more than 10 bar, more than 11 bar, more than 12 bar and between 12 bar and 18 bar.

8. The method of claim 1, wherein compressed air from the overpressure volume is applied to the at least one first air spring and a second air spring of the plurality of air springs individually in a chronologically consecutive manner, in a specified compressed air quantity in each case and/or for a predefined period of time in each case and/or to achieve a predefined pressure drop in the air distributor module.

9. The method of claim 8, wherein the period of time and/or the compressed air quantity determined for the at least one first air spring and the second air spring differs.

10. The method of claim 8, wherein the compressed air quantity and/or the period of time for at least one of the first and second air springs is determined on the basis of a relative pressure difference between the pressure of the at least one first and/or second air spring and the pressure in the air dryer and/or the pressure in the air distributor module.

11. The method of claim 2, wherein compressed air from the overpressure volume is applied to the at least one first air spring and a second air spring individually in a chronologically consecutive manner on the basis, in each case, of a measured pressure drop in the air distributor module, a known air dryer volume, air distributor module volume and an air spring volume of the plurality of air springs and/or an adaptively determined time interval.

12. The method of claim 1, wherein the at least one first air spring has a pressure which, in comparison with the pressures in the remaining air springs, has the smallest pressure difference to the pressure in the air distributor module.

13. The method of claim 1, wherein compressed air from the overpressure volume is discharged individually in each case into the plurality of air springs in a chronologically consecutive manner, beginning with the air spring having a pressure which, compared to the pressures in the remaining air springs, has the smallest pressure difference to the pressure in the air distributor module.

14. The method of claim 13, wherein, in accordance with the order of the plurality of air springs ascertained based on the smallest pressure difference to the pressure in the air distributor module, compressed air from the overpressure volume is applied to the plurality of air springs again in the same order in a chronologically consecutive manner, in a or the specified compressed air quantity and/or for a or the predefined period of time in each case and/or to achieve a predefined pressure drop in the air distributor module.

15. The method of claim 1, wherein a compressed air quantity is individually specified for the at least one first air spring and/or the intermediate store, and the compressed air supply is activated by the controller in such a way that compressed air is discharged into the at least one first air spring and/or the intermediate store in the compressed air quantity specified in each case.

16. The method of claim 1, wherein a period of time is individually specified for the at least one first air spring and/or the intermediate store, and the compressed air supply is activated by the controller in such a way that compressed air is discharged into the at least one first air spring and/or the intermediate store for the period of time specified in each case.

17. The method of claim 1, wherein the compressed air supply is activated by the controller in such a way that the compressor stores a portion of the compressed air while compressed air is being vented through an exhaust, so that compressed air is emitted to a surrounding atmosphere at a comparatively lower pressure difference between a pressure at the exhaust and a pressure in the surrounding atmosphere.

18. The method of claim 1, wherein the vehicle is a passenger car.

19. A pneumatic system for a vehicle comprising:

a compressed air supply and an air spring arrangement having a plurality of air springs and being pneumatically connected to the compressed air supply;

the pneumatic system having a controller for controlling the compressed air supply and the air spring arrangement and being configured to carry out a method for operating the pneumatic system;

in the method:

an air dryer and/or an air distributor module represents an overpressure volume, wherein:

the overpressure volume initially has a pressure greater than a pressure in a remaining portion of the compressed air supply with the remaining portion being defined by a compensation volume;

the pneumatic system further having at least one first air spring and an intermediate store or the intermediate store; wherein the method comprises:

discharging compressed air from the overpressure volume into the compensation volume, accompanied by a reduction in the pressure in the overpressure volume with an accompanying reduction in the pressure in the air dryer and/or reduction in the pressure in the air distributor module;

wherein compressed air is discharged into the at least one first air spring of the air spring arrangement and into the intermediate store, wherein the intermediate store comprises the compressor and/or a connecting volume wherein the connecting volume has a pneumatic return flow line connecting the gallery to the compressor via a return flow valve.

20. The pneumatic system of claim 19, wherein the compressed air supply comprises the following components: a compressor, the air distributor module, the air dryer, an intake with an intake valve and an exhaust with an exhaust valve for filling with air from a surrounding atmosphere and/or for venting into the surrounding atmosphere, and a pressure sensor for detecting a level of a pressure in the air distributor module and for providing a pressure signal representing the level of the pressure detected, wherein the controller is configured to control, at least depending on the pressure signal, the compressed air supply and the air spring arrangement to carry out the method.

21. The pneumatic system of claim 19, wherein the vehicle is a passenger car.

22. A vehicle comprising a pneumatic system as claimed in claim 19.

* * * * *